United States Patent [19]

Ishikawa et al.

[11] Patent Number: 4,661,703
[45] Date of Patent: Apr. 28, 1987

[54] TWO-COLOR COPYING MACHINE

[75] Inventors: Noriyoshi Ishikawa; Haruhiko Takahashi; Hitoshi Funato; Svay Leng; Hiroyuki Saitoh; Takashi Ohmori; Masami Kurata; Yasuo Katou, all of Kanagawa, Japan

[73] Assignee: Fuji Xerox Co., Ltd., Tokyo, Japan

[21] Appl. No.: 763,792

[22] Filed: Aug. 8, 1985

[30] Foreign Application Priority Data

Aug. 9, 1984 [JP] Japan .................. 59-165727

[51] Int. Cl.⁴ .............................................. G03C 5/16
[52] U.S. Cl. .................. 250/317.1; 250/318; 250/319; 346/76 PH; 400/120
[58] Field of Search ............. 250/317.1, 318, 319; 346/76 PH, 160; 400/120; 219/216 PH; 355/144 C, 144 CU

[56] References Cited

U.S. PATENT DOCUMENTS

| | | | |
|---|---|---|---|
| 4,469,433 | 9/1984 | Kurata et al. | 346/76 PH |
| 4,517,590 | 5/1985 | Nagashima et al. | 346/76 PH |
| 4,536,774 | 8/1985 | Inui et al. | 346/76 PH |
| 4,574,293 | 3/1986 | Inui et al. | 400/120 |

Primary Examiner—Craig E. Church
Assistant Examiner—John C. Freeman
Attorney, Agent, or Firm—Finnegan, Henderson, Farabow, Garrett and Dunner

[57] ABSTRACT

A two-color copying machine records an image on a recording sheet in two colors such as red and black by using thermally transferable red and black inks on ink donor sheets. The two-color copying machine includes a platen for supporting an original to be copied, a scanner unit movable reciprocally with respect to the platen for reading the original and for generating an image signal for each line which is separated into two single color image signals, each corresponding to one of the two colors, a pair of thermal heads each for selectively generating thermal pulses in response to the image signal from the scanner unit, an ink donor sheet supply assembly for supplying the thermal heads with respective ink donor sheets coated with thermally transferable inks of different colors, respectively, which can be fluidized or sublimated upon being heated, a recording sheet supply assembly for supplying a recording sheet in the vicinity of the thermal heads, a recording sheet contacting assembly for bringing the supplied recording sheet into intimate contact with a heating region of each of the thermal heads with the ink donor sheet interposed between a thermal head and an ink donor sheet, a recording sheet peeling assembly for peeling the recording sheet off the ink donor sheets after the image has been recorded on the recording sheet, and a discharge assembly for discharging the peeled recording sheet.

12 Claims, 33 Drawing Figures

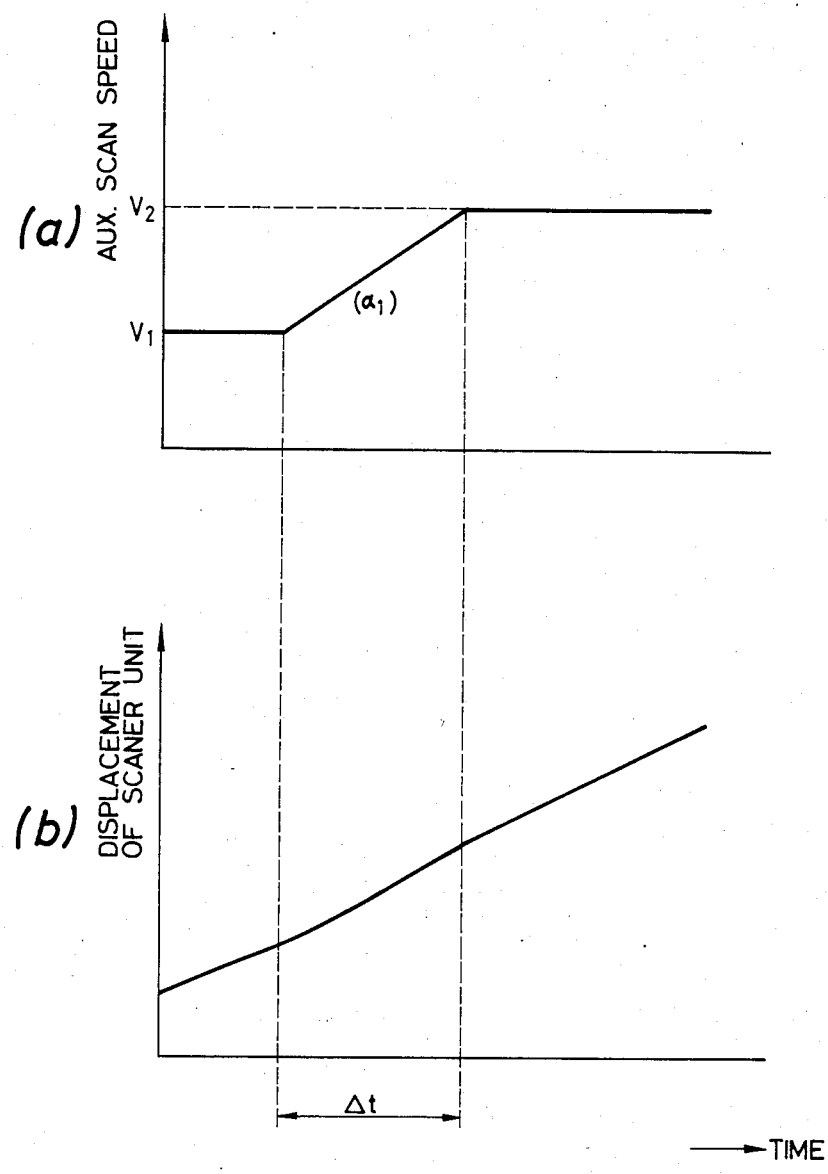

TWO-COLOR COPYING MACHINE

RELATED APPLICATIONS

This application is related to Ser. No. 762,866 filed Aug. 6,1985 entitled "Copying Machine" which is incorporated herein by reference.

BACKGROUND OF THE INVENTION

1. Field of the Invention

The present invention relates to a two-color copying machine employing two ink donor sheets of different recording colors for recording data in two colors on a recording sheet of paper. The ink donor sheets are thermal-transfer-type recording mediums.

2. Description of the Prior Art

Many document materials and pamphlets are printed in two colors such as red and black. One purpose of using two colors is to highlight some items. Two-color copying machines utilizing electrostatic photography have been available. These two-color copying machines employ two electrostatic recording drums or sheets upon which electrostatic latent images are respectively formed. The latent images are developed with toner of respective colors. The two toner images thus produced are then transferred and thermally fixed to a recording sheet to finally produce a recorded image.

The conventional two-color copying machine can produce a number of copies by repeatedly exposing a single original, but consumes a large amount of electric power when fixing the toner images to the recording sheet. Since a large amount of heat is radiated from the fixing device, a heat insulator mechanism and an exhaust mechanism are required to protect other circuit components from the heat radiation. This causes the copying machine to be large and expensive to manufacture

SUMMARY OF THE INVENTION

In view of the drawbacks of the conventional two-color copying machine, it is an object of the present invention to provide a two-color copying machine which can produce a number of recorded images from a single original, yet require a small amount of electric power, be small in size, and be inexpensive to manufacture.

According to the present invention, there is provided a two-color copying machine comprising a platen for supporting an original to be copied, a scanner unit reciprocally movable with respect to the platen for reading the original, line-by-line, to produce image signals separated in two colors, a thermal head for selectively generating thermal pulses in response to the image signals from the scanner unit, ink donor sheet supply means for supplying the thermal head with ink donor sheets coated with thermal transfer recording mediums which can be fluidized or sublimed upon being heated, recording sheet feed means for feeding a recording sheet in the vicinity of the thermal head, ink transfer means for pressing the supplied recording sheet into intimate contact with a heating section of the thermal head through each of the ink donor sheets, peeling means for peeling the recording sheet to which the inks have been transferred from the ink donor sheets, and recording sheet discharge means for discharging the recording sheet peeled off the ink donor sheets.

This thermal image transfer process achieves the foregoing object because no thermal fixing process is used, and the recording assembly is reduced in size.

The two-color copying machine of this invention may include a buffer memory for temporarily storing the image signals from the scanner unit, and speed control means for controlling the speed of the scanner unit or the platen in a direction defined as an auxiliary scanning direction when the original is read, depending on the number of the image signals accumulated in the buffer memory, for correcting a reading error.

The two-color copying machine of this invention may also include two light sources having different spectral characteristics. One of the light sources may be continuously energized when the image on the original is read, while the other light source may be caused to flicker in synchronism when the scanning operation at the time the original is read. The same reading line of the original is scanned at least twice, once with light having a first spectral distribution characteristic and the second time with light having a second spectral distribution characteristic. Then the reading position is shifted to the next line, so that image signals separated in two colors can be generated based on two image signals produced from reading the same line with different light source characteristics.

In addition, the two-color copying machine of this invention may also comprise a thermal storage computing unit for computing the thermal storage condition of each heating body unit of the thermal head from the condition of the image signal which affects the heating of the heating body unit, a memory for storing the duration of a pulse applied to each heating body unit to control the heating at the time of recording the preceding line and for issuing the stored pulse duration as thermal hysteresis data, pulse duration computing means for computing the duration of the pulse applied to each unit heating body with the thermal hysteresis data employed as a minimum data, and correcting means for correcting the computed pulse duration from the pulse duration computing means based on the data relating to the number or ratio of printing dots for a line to be currently printed, or the data relating to the temperature of the substrate of the thermal head, or both. With this arrangement, high-quality images can be produced in high-speed recording. As described later on, various modifications are available for the control of the energy of printing dots.

It is possible to reproduce one or two colors in halftone in the two-color copying machine by employing a matrix of dots. For reproducing a halftone, the two-color copying machine of this invention includes thermal storage correcting means for computing the ratio of dots to be currently printed based on image information for dots surrounding the dots to be currently printed and the thermal storage condition of the surrounding dots in the previous printing operation, to properly control the energy which is applied for printing.

The two-color copying machine of this invention may have a displacement detecting means in each recording assembly for detecting the displacement of the recording sheet. Any color shift during the two-color recording operation can effectively be prevented by controlling the displacement of the recording sheet so that the displacements as detected by the displacement detecting means will be equalized.

The two-color copying machine of this invention may also include an attachment for loading and detaching a cassette in order to use an ink donor sheet contained in the cassette.

These and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 15 is a set of diagrams explanatory of speed control;

DESCRIPTION OF THE PREFERRED EMBODIMENTS

General Arrangement of Two-color Copying Machine

Figure 1:
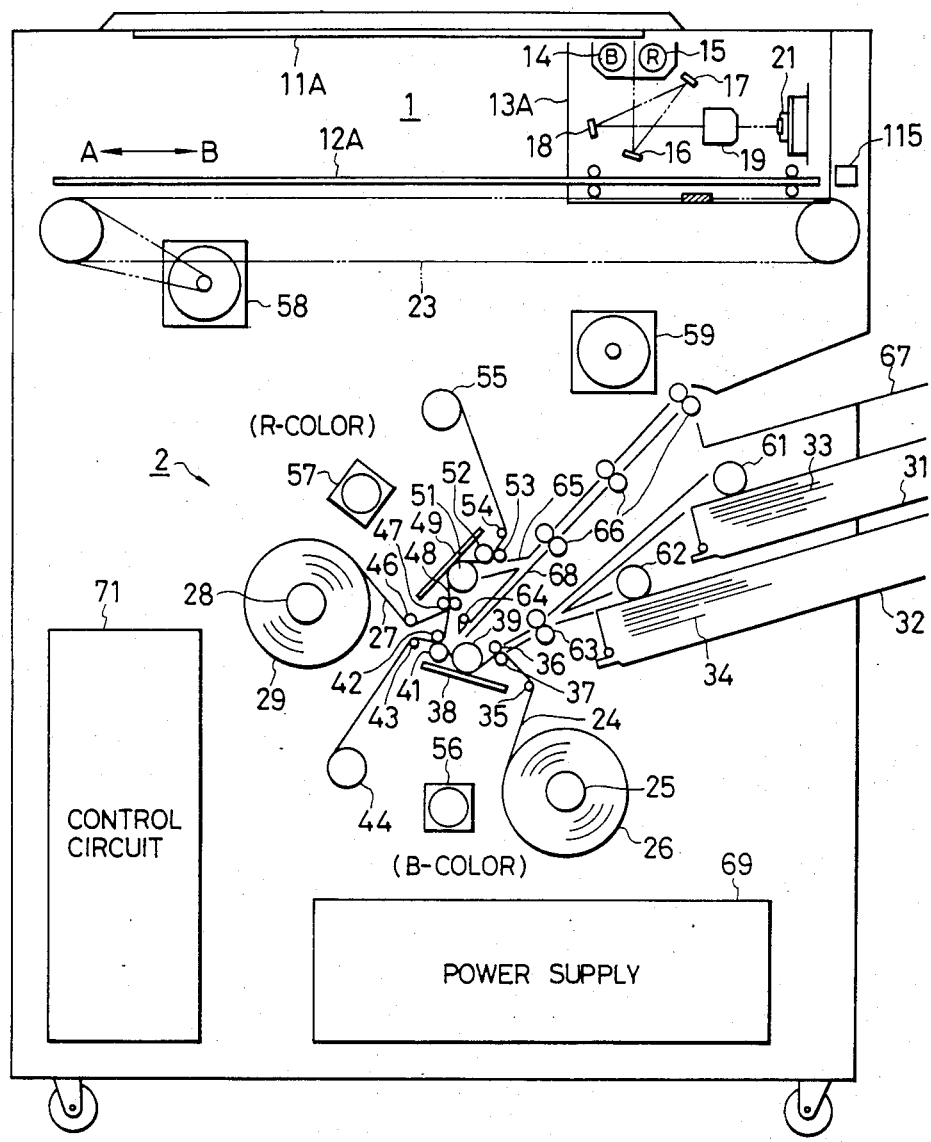
FIG. 1 is a schematic view of a two-color copying machine according to a first embodiment of the present invention.

FIG. 1 shows the general arrangement of a copying machine according to a first embodiment of the present invention.

The copying machine has an image reader assembly 1 for reading image information from an original to be copied, and a two-color recording assembly 2 for producing a two-color recorded image based on the image information from the image reader assembly 1. The image reader assembly 1 is composed of a fixed platen 11A on which the original is placed, and a scanner unit 13A reciprocally movable on rails 12A extending parallel to the platen 11A. The scanner unit 13A houses blue and red fluorescent lamps 14 and 15 which are slightly longer than the width of the platen 11A and juxtaposed at a prescribed spacing. The fluorescent lamps extend in the main scanning direction which is the direction normal to the direction in which the scanner unit 13A is movable.

Three reflecting mirrors 16, 17 and 18 are disposed below the fluorescent lamps 14 and 15 for successively transmitting a light beam emitted by the lamps 14 and 15 and reflected from the original placed on the platen 11A. The light beam reflected from the original is transmitted by reflecting mirrors 16, 17 and 18 and through a preset light path to an optical lens 19. The optical lens 19 produces a light image which is then converted by an image sensor 21 into an analog electric image signal.

Scanner unit 13A includes a light source energization control circuit (not shown) for continuously energizing the blue fluorescent lamp 14 and for intermittently energizing the red fluorescent lamp 15 in each scanning operation. The scanner unit 13A also contains a circuit for processing the image signal issued from the image sensor 21. The scanner unit 13A is reciprocally movable on the rails 12A by a belt 23 which is driven by a motor.

The two-color recording assembly 2 has a black-color supply roll 26 composed of a black ink donor sheet 24 wound around a paper tube 25 for recording an image in black, and a red-color supply roll 29 composed of a red ink donor sheet 27 wound around a paper tube 28 for recording an image in red. The black and red ink donor sheets 24 and 27, respectively, have a width slightly larger than the width of recording sheets 33 and 34 selectively supplied from two upper and lower paper feeders 31 and 32 respectively. The black ink donor sheet 24 is composed of base paper such as condenser paper coated on one side with a thermally transferable black ink which can be fluidized or sublimed upon being heated. The red ink donor sheet 27 is composed of base paper such as condenser paper coated on one side with a thermally transferable red ink which can be fluidized or sublimed upon being heated.

The black ink donor sheet 24 is unreeled from the black-color supply roll 26 and delivered through a guide roll 35 and a pair of feed rolls 36 and 37, and supplied between a black-color thermal head 38 and a black-color back roll 39 for a recording operation. Thereafter, the black ink donor sheet 24 passes between a black-color drive roll 41 and a black-color pinch roll 42, and is wound through a guide roll 43 around a black-color takeup roll 44.

Likewise, the red ink donor sheet 27 is unreeled from the red-color supply roll 29 and delivered through a guide roll 46 and a pair of feed rolls 47 and 48, and supplied between a red-color thermal head 49 and a red-color back roll 51 for recording operation. Thereafter, the red ink donor sheet 27 passes between a red-color drive roll 52 and a red-color pinch roll 53, and is wound through a guide roll 54 around a red-color takeup roll 55.

A black-color printer motor 56 is provided for driving the delivery system for the black ink donor sheet 24, and a red-color printer motor 57 is provided for driving the delivery system for the red ink donor sheet 27. The two-color copying machine also has a scanner motor 58 and a recording sheet motor 59 disposed adjacent to the belt 23. The scanner motor 58 comprises a step motor for reciprocally moving the scanner unit 13A through belt transmission. The recording sheet motor 59 comprises a step motor for supplying the stacked recording sheets 33 and 34 from the paper feeders 31 and 32 with paper feed rolls 61 and 62, respectively, to a position for thermal transfer recording operation.

The recording sheets 33 and 34 accommodated in the paper feeders 31 and 32 are selectively fed out by the paper feed rolls 61 and 62 which are selectively driven by clutches (not shown). The recording sheet 33 or 34 thus fed out is brought into positional registration by register rolls 63. Thereafter, the recording sheet 33 or 34 is superposed on the black ink donor sheet 24, and an image is recorded in black on the recording sheet between the black-color thermal head 38 and the black-color back roll 39. After the image has been recorded, the black ink donor sheet 24 is transferred for a prescribed period of time together with the recording sheet 33 or 34. The black ink donor sheet 24, having passed between the black-color back roll 39 and the black-color thermal head 38, is then passed through a bent path between the black-color drive roll 41 and the black-color pin roll 42. At this time, the recording sheet 33 or 34 is peeled off the black ink donor sheet 24 since the recording sheet cannot follow the bent path due to its rigidity.

A recording sheet directional control member 64 is disposed above the recording sheet 33 or 34 after they are peeled off for selecting the direction of feed of the recording sheet 33 or 34. The recording sheet directional control member 64 is angularly movable by a solenoid or a motor (not shown). When the recording sheet directional control member 64 is held in position for guiding the recording sheet 33 or 34 as peeled off the black ink donor sheet 24 in a directly upward direction, the recording sheet is thereafter brought into superimposed relation to the red ink donor sheet 27. Then, the recording sheet and the red ink donor sheet 27 are passed between the red-color thermal head 49 and the red-color back roll 51 for recording an image in red. The recording sheet 33 or 34 is thereafter peeled off the red ink donor sheet 27, and guided by a guide 65 into a discharge path. There are three pairs of delivery rollers 66 on the discharge path for discharging the recording sheet 33 or 34 onto a paper catch tray 67.

When the recording sheet directional control member 64 is positioned for guiding the recording sheet 33 or 34 in an obliquely upward direction, the recording sheet is guided by a guide 68 with its inlet aligned with the obliquely upward direction so as to be discharged through the discharge path onto the paper catch tray 67. A casing 69 housing a power supply for the copying machine is disposed below the paper feeder 32. A casing 71 accommodating a control circuit for the copying machine is positioned on the left-hand side (as shown in FIG. 1) of the casing 69.

The details of two-color copying machine as well as its copying operation will be described below.

Control Panel

Figure 2:
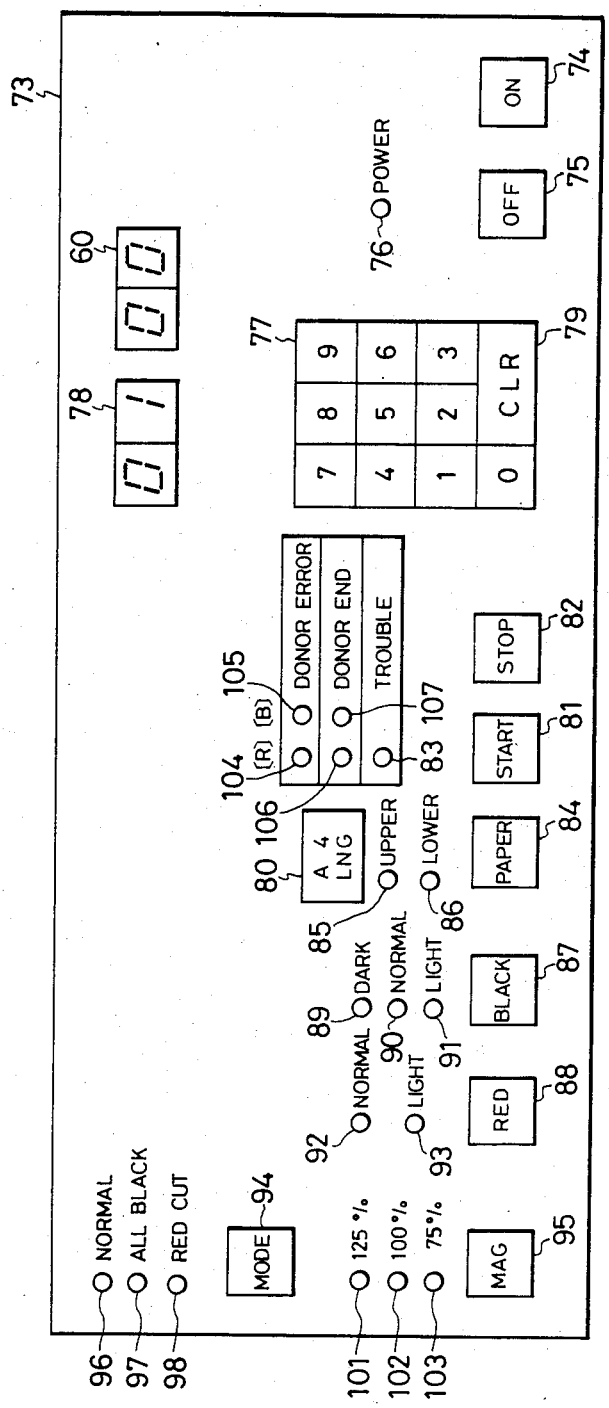
FIG. 2 is a plan view of a control panel of the two-color copying machine shown in FIG. 1.

FIG. 2 shows a control panel 73 of the two-color copying machine.

There are many buttons, indicators, and two counters on the control panel 73. A power supply ON button 74 and a power supply OFF button 75 serve to control ON and OFF of the power supply. When the power supply is ON, a power indicator 76 is lighted, indicating to the operator that the copying machine is ready for copying operation. A ten-key pad 77 includes switches for setting the number of copies to be produced, the number thus set being indicated on a set counter 78. An output counter 60 positioned adjacent to the set counter 78 serves to indicate the number of copies which have been produced. The copying operation is finished when the indications on the counters 60 and 78 coincide.

When it is desired to change the number indicated on the set counter 78, a clear button 79 is pressed and then the desired number of copies is entered again through the ten-key pad 77. When, however, the ten-key pad 77 is depressed upon elapse of 5 seconds after the number of copies is set in the set counter 78, the new number of copies is set in the set counter 78 even if the clear button 68 is not depressed.

A start switch 81 and a stop switch 82 are positioned substantially centrally on the control panel 73. The start switch 81 serves to start copying operation, and the stop switch 82 is depressed when it is necessary to stop the operation of the copying machine. When the recording sheet or the ink donor sheet is jammed in the copying machine or the copying machine malfunctions, a sensor in the copying machine detects such a paper jam or malfunction and stops the operation of the copying machine without depression of the stop switch 82. When this happens, a trouble indicator 83 flickers to let the operator know the cause of the trouble. The trouble indicator 83 continues flickering until the operator removes the cause of the trouble and then presses the clear button 79. While the trouble indicator 83 is flickering, the copying machine will not resume its operation even if the start switch 81 is depressed.

A recording sheet selector switch 84 is positioned on the left-hand side (as shown in FIG. 2) of the start switch 81. An upper paper feeder selection indicator 85 and a lower paper feeder selection indicator 86 are disposed above the recording sheet selector switch 84. The paper feeder selection indicators 85 and 86 are alternatively energized each time the recording sheet selector switch 84 is depressed. When the upper paper feeder selection indicator 85 is ON, the upper paper feeder 31 is selected to copy a desired image on the recording sheet 33 which may be of the A4 size, for example. When the lower paper feeder selection indicator 86 is ON, the lower paper feeder 32 is selected to copy a desired image on the recording sheet 34 which may be of the B4 size, for example. The size and orientation of the recording sheets stored in the paper feeder which is indicated by the paper feeder selection indicator 85 or 86 are detected by a sensor (not shown) which detects the types of the paper feeders, and the detected data are indicated on a recording sheet indicator 80. In the illustrated example, the recording sheet indicator 80 indicates that A4 recording sheets are set in the longitudinal direction.

Depending on the size and orientation of the recording sheets indicated on the recording sheet indicator 80, the two-color copying machine automatically sets the interval or length of scanning operation of the scanner unit and the width across which an image is recorded by the thermal head, as described later on, for reducing the power consumption of the copying machine and preventing the rolls in the two-color recording assembly from being smeared by printing in an unwanted region.

A black-density changing switch 87 and a red-density changing switch 88 are located on the left-hand side of the recording sheet selector switch 84. These switches 87 and 88 serve to change the recording density of black and red in several steps by slightly varying the quantity of heat generated by the thermal head. Each time the black-density changing switch 87 is depressed, indicators 89, 90 and 91, indicating three densities, "dark", "normal", and "light", respectively, are successively energized one at a time to select and indicate a desired recording density in black. Similarly, each time the red-density changing switch 88 is depressed, indicators 92 and 93 indicating two densities, "normal" and "light", respectively, are successively energized one at a time and selecting a desired recording density in red.

A mode selector button 94 and a magnification setting button 95 are positioned on the left-hand end of the control panel 73. The mode selector button 94 is a switch for selecting the recording color. Each time the mode selector button 94 is depressed, three color modes are successively selected. When a "normal" mode is selected, a normal indicator 96 is lighted. In this color mode, red image information is recorded in the recording color of red, and black image information is recorded in the recording color of black. When a "full black" mode is selected, a full-black indicator 97 is lighted. In this color mode, red and black image information is recorded in the recording color of black. When a "red-cut" mode is selected, a red-cut indicator 98 is lighted. In this color mode, black image information is recorded in black, but red image information is not recorded. The red-cut mode is used to erase a red underline on the original or remove answers in red from a question sheet.

The magnification setting button 95 serves to set a desired copying magnification. Each time the magnification setting button 95 is depressed, the copying magnification is cyclically changed from 125% to 100% to 75%, and the copying magnification as thus set is indicated by indicators 101, 102 and 103, respectively.

Four indicators 104 through 107 for indicating conditions of the ink donor sheets are disposed substantially centrally on the control panel 73. The donor error indicators 104 and 105 are energized when the ink donor sheets are placed in the wrong positions. More specifically, when the red ink donor sheet is positioned in the black recording unit, the donor error indicator 104 is lighted, and when the black ink donor sheet is positioned in the red recording unit, the donor error indicator 105 is lighted.

The donor end indicators 106 and 107 are energized when the remaining lengths of the red and black ink donor sheets, respectively, become small. A mechanism for detecting the remaining lengths of the ink donor sheets will be described later on.

Operation of the Two-color Copying Machine (Image Reading and Processing)

After an original to be copied has been placed on the platen 11A shown in FIG. 1, the operator depresses the power supply ON button 74 on the control panel 73. The power supply of the copying machine is switched on and the power indicator 76 is lighted.

Figure 3:
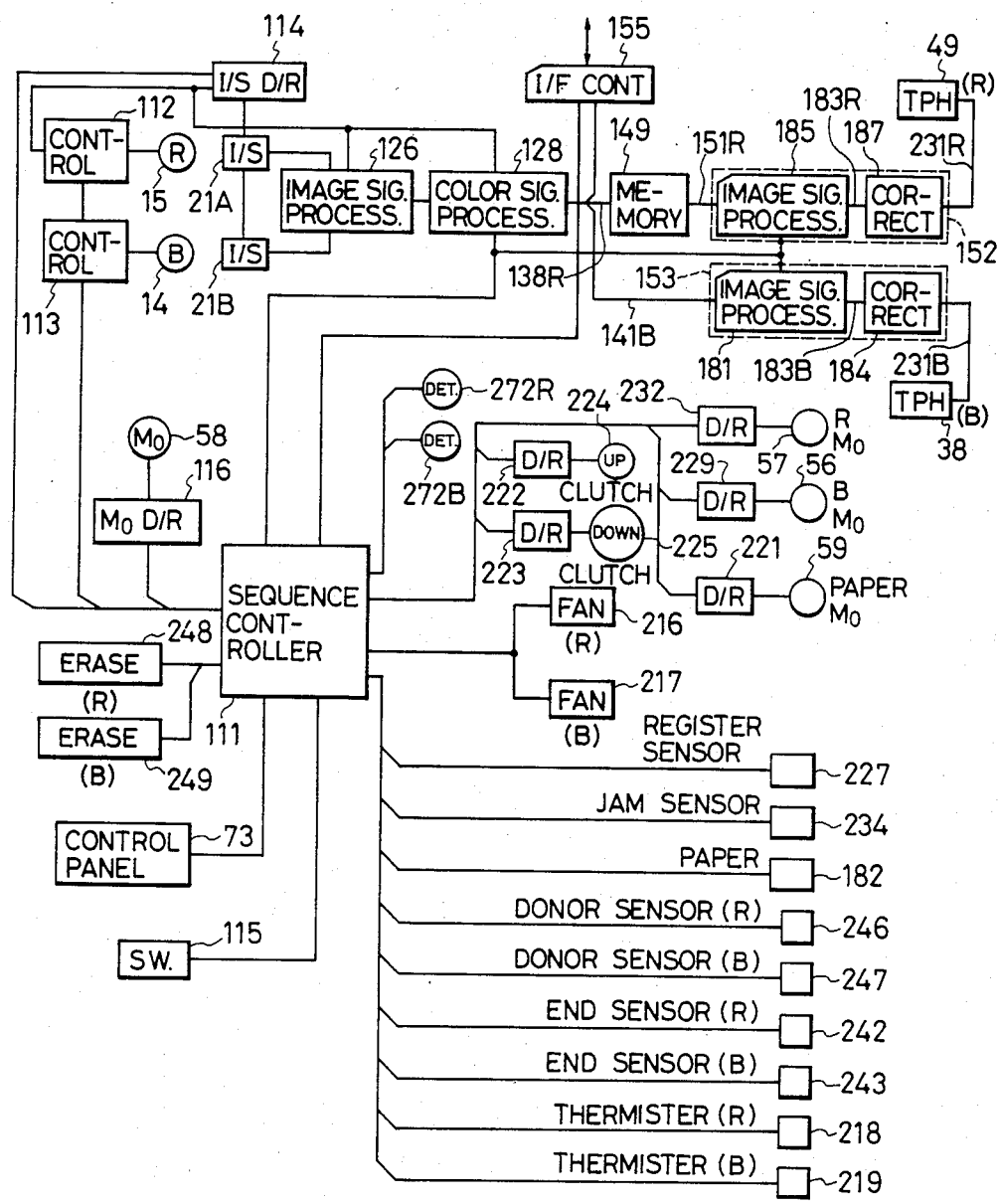
FIG. 3 is a block diagram of an electric circuit of the two-color copying machine of FIG. 1.

FIG. 3 illustrates an electric circuit of the two-color copying machine. When the start switch 72 on the control panel 73 shown in FIG. 2 is pressed, a sequence controller 111 ascertains whether the copying machine is operable or not. If the copying machine is free from any malfunctions and can operate normally for recording, then the sequence controller 111 supplies a drive signal to an image sensor driver 114. Simultaneously, controller 111 ascertains whether the scanner unit 13A (FIG. 1) is in a start or home position based on positional information delivered from a scanner position detecting switch 115 disposed adjacent to an end of the guide rail 12A (FIG. 1). If the scanner unit 13A is not in the home position, then the sequence controller 111 supplies a drive signal to a motor drive circuit 116 to energize the scanner motor 58 for setting the scanner unit 13A to the home position. The sequence controller 111 contains a timing mechanism for measuring the time required for such setting of the scanner unit 13A. When the scanner unit 13A is not set to the home position within the prescribed time, the sequence controller 111 determines that the copying machine suffers a malfunction. Then, the sequence controller 111 stops the supply of the drive signal to the motor drive circuit 116 and energizes the trouble indicator 83.

When the scanner unit 13A is set to the home position within the prescribed time, the position of the scanner unit 13A is confirmed by the scanner position detecting switch 115. Thereafter, the sequence controller 111 energizes the motor drive circuit 116 to rotate the scanner motor 58 in a normal direction or a reverse direction thereby reciprocating the scanner unit 13A.

When the set counter 78 (FIG. 2) is set to one, so that only one copy is to be produced, the sequence controller 111 enables the scanner unit 13A to read the image information of the original on a forward stroke of the scanner unit 13A. Scanning occurs in the auxiliary scanning direction A-B, shown in FIG. 1. The distance of auxiliary scanning corresponds to the size of the original. When this has been effected, the sequence controller 111 reverses the direction of rotation of the scanner motor 58, and shortens the period of drive pulses issued from the motor drive circuit 116. This causes the scanner motor 58 to return the scanner unit 13A rapidly to the home position.

Where two or more copies are produced on the two-color copying machine, the scanner unit 13A reads the image information not only on its forward stroke but also on its return stroke. When the set counter 78 is set to two or more counts, the scanner unit 13A moves at equal speeds on the forward and return strokes unless the number of remaining copies to be produced at the home position is 1. When the number of remaining copies to be produced becomes 1, the same control as for producing only one copy is carried out. The distance of movement of the scanning unit 13A in the direction of the auxiliary scanning is determined by the sequence controller 111 based on information on the size of recording sheet obtained from the condition of the recording sheet selector switch 84 and a copying magnification selected by the magnification selecting button 95 (FIG. 2) on the control panel 73.

Image sensor 21 includes two image sensing units 21A and 21B. When the scanner unit 13A moves on its forward stroke or its return stroke, image sensors 21A and 21B read one line at divided intervals and convert a light image into an electric signal for each line.

Figure 4:
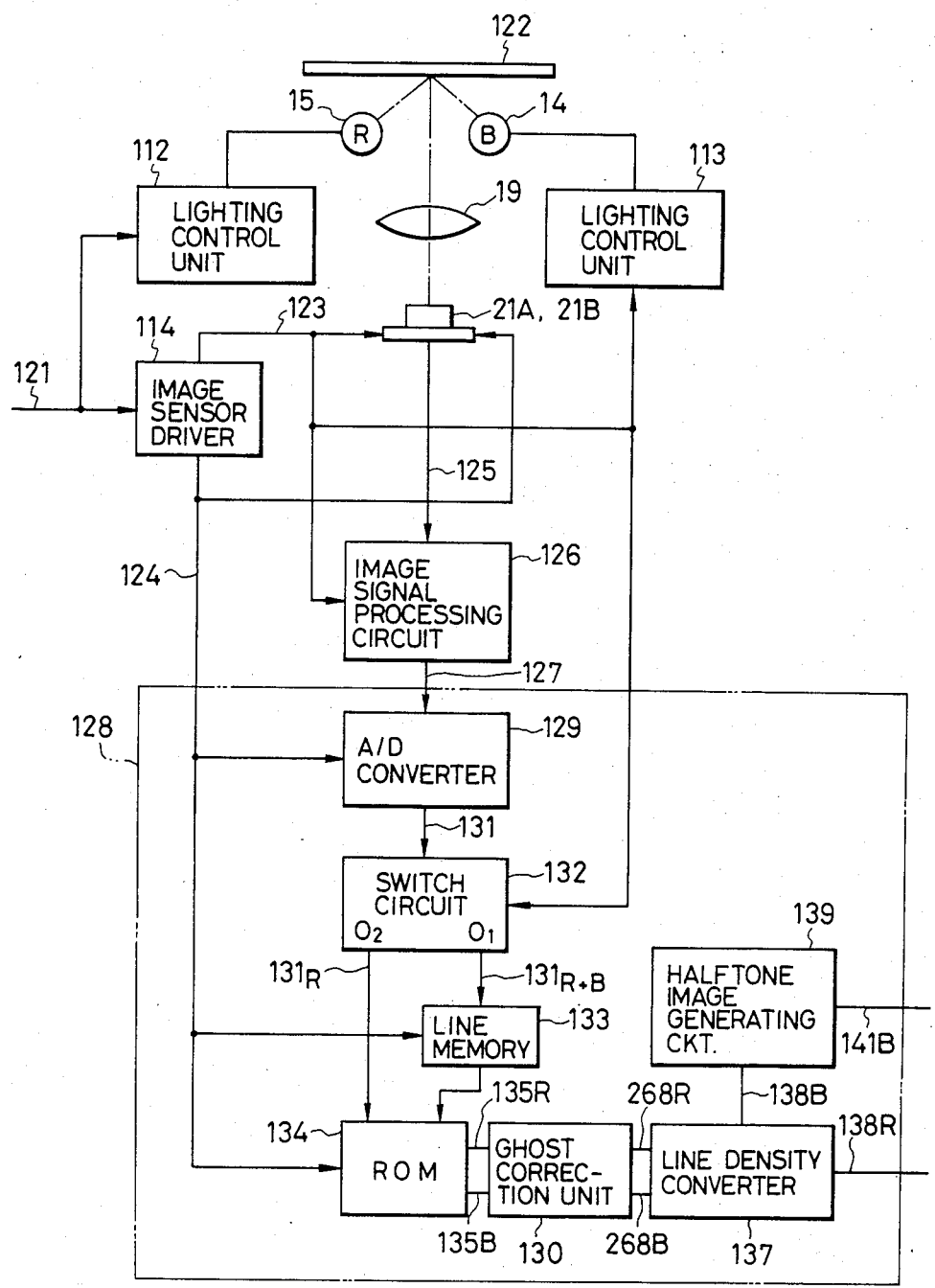
FIG. 4 is a block diagram of a circuit arrangement for reading an image and color separation in the two-color copying machine of the first embodiment.

FIG. 4 shows a circuit arrangement for reading image information and effecting color separation. A lighting control unit 112 for controlling the energization of the red fluorescent lamp 15 is supplied with a drive signal 121. When (i) the start switch 81 (FIG. 2) is depressed and (ii) an original 122 is red, the drive signal 121 is rendered active during the entire scanning period to energize the red fluorescent lamp 15. Another lighting control unit 113 serves to control the energization of the blue fluorescent lamp 14. The lighting control unit 113 is supplied with a scanning start signal 123 from the image sensor driver 114 which is started to operate by the drive signal 121. The scanning start signal 123 serves to start each scanning operation. Each time the scanning start signal 123 is applied, the lighting control unit 113 energizes or de-energizes the blue fluorescent lamp 14. Therefore, the red fluorescent lamp 15 is constantly lighted while the original 122 is being read, and the blue fluorescent lamp 5 is switched on or off in each scanning operation.

Each of image sensors 21A and 21B in the two-color copying machine comprises a CCD (Charge-Coupled Device) line sensor composed of 2048 photoelectric transducers arrayed at intervals of 1/12 mm. By using the two image sensors 21A and 21B for reading the image, the length of the optical path between the original 122 and the image sensors 21A and 21B can be reduced, and the optical system may be more compact. The image sensors 21A and 21B are supplied with an image signal clock 124 from the image sensor driver 114 for issuing analog image signals 125 for respective pixels in synchronism with the supplied image signal clock.

The image signal is supplied to an image signal processing circuit 126 which processes the supplied image signal in an automatic background process to remove noise from the image signal. The image signal processing circuit 126 also adjusts the level of the image signal 125 since the illumination of the original 122 varies widely for every scanning operation.

A processed image signal 127 from the image signal processing circuit 126 is suplied to a color signal processing circuit 128 having an A/D converter 129. The image signal 127 is converted by the A/D converter 129 into a digital signal in synchronism with the image signal clock 124. The digital image signal 131 is then supplied to a switch circuit 132 in the color signal processing circuit 128 which issues the image signal 131 in an altering fashion to output terminal $O_1$ or output terminal $O_2$ each time the scanning start signal 123 is applied.

Figure 5:
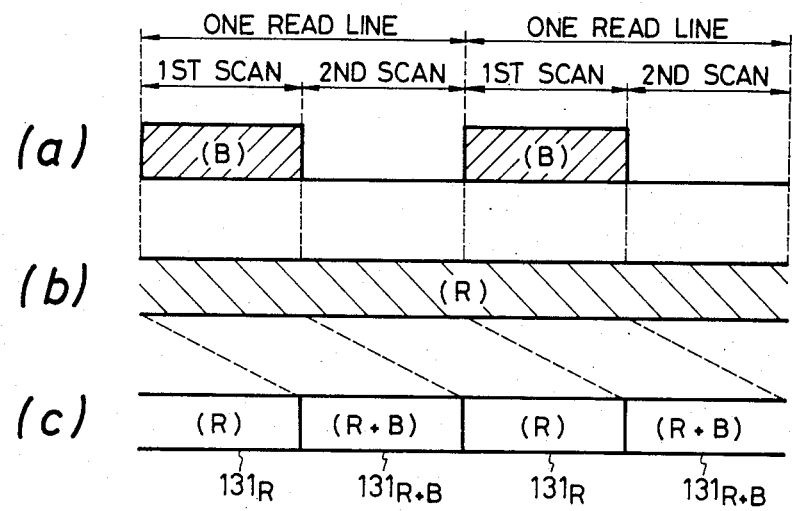
FIG. 5 is a diagram showing the relationship between the timing of energization of fluorescent lamps and image signals as read.

In this embodiment, the blue fluorescent lamp 14 is energized in a first scanning operation in one reading line and de-energized in a second scanning operation in the same reading line, as shown in FIG. 5(a), during which time the red fluorescent lamp 15 is continuously energized as shown in FIG. 5(b). In the first scanning operation, the image signal 131 supplied to the switch circuit 132 is an image signal $131_R$ read during illumination by the red fluorescent lamp 14, and in the second scanning operation, the image signal 131 supplied to the switch circuit 132 is an image signal $131_{R+B}$ read during illumination by both the red fluorescent lamp 14 and the blue fluorescent lamp 15 (FIG. 5(c)). The switch circuit 132 first issues the image signal $131_{R+B}$ to its first output terminal $O_1$, and then issues the image signal $131_R$ to its second output terminal $O_2$. Thereafter, the image signals $131_{R+B}$, $131_R$ are switched in each scanning operation in the same manner.

The image signal $131_{R+B}$ is supplied to a line memory 133 and delayed thereby for one scanning operation so as to serve as high-order addressing information for a color conversion means such as a color conversion ROM (Read-Only Memory) 134. The image signal $131_R$ is supplied directly to the color converstion ROM 134 as low-order addressing information therefor. The line memory 133 serves to adjust the timing at which the two image signals $131_{R+B}$ and $131_R$ on the same reading line are issued as addressing information.

The color conversion ROM 134 has a color conversion table for successively converting colors for the total of 4096 pixels in the reading line in synchronism with the image signal clock 124. The color conversion means (i) extracts red image information from the original 122 and converts the extracted red image information into a two-valued signal 135R, and (ii) converts image information other than the red image information into a 15-stage image signal 135B. The image signal 135R is used to record an image in red with the red ink donor sheet 27 shown in FIG. 1, and the image signal 135B is used to record an image in black with the black ink donor sheet 24.

(Principles of Color Conversion)

The principles of the color conversion by the color conversion ROM 134 will now be described.

Figure 6:
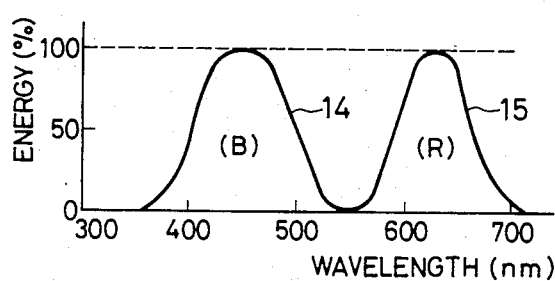
FIG. 6 is a diagram of the spectral characteristics of the two fluorescent lamps.

FIG. 6 is illustrative of the spectral characteristics of the blue and red fluorescent lamps. The left-hand curve represents the spectral characteristics of the blue fluorescent lamp 14, while the righthand curve represents the spectral characteristics of the red fluorescent lamp 15. The blue fluorescent lamp 14 is coated with a fluorescent material which may comprise calcium tungstate, for example, and the red fluorescent lamp 15 is coated with a fluorescent material which may comprise magnesium germanate, for example. In the first scanning operation illustrated in FIG. 5, both of the fluorescent lamps 14 and 15 are energized to illuminate the original 122 with visible light over its substantially entire wavelength range, i.e., with approximately white light. In the second scanning operation on the same reading line, only the red fluorescent lamp 15 is energized to illuminate the original 122 in a red-light wavelength range.

Figure 7:
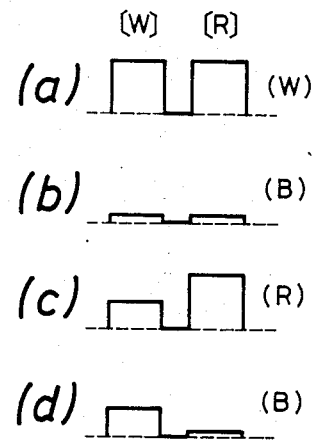
FIG. 7 is a waveform diagram showing the relationship between light illuminating an original and image signal levels.

FIG. 7 illustrates the relationship between the colors of lights radiated on the original and the image signal levels for respective colors of the original at the time the aforesaid fluorescent lamps are employed. FIG. 7(a) shows the instance where a white (background color)

portion of the original is read. Approximately 100% light is reflected from the original when it is illuminated with approximate white light or red light and the signals have the maximum levels. When a pure black portion of the original is read, as shown in FIG. 7(b), substantially no light is reflected from the original when it is illuminated with approximate white light or red light, and the signal levels are almost zero.

When an image drawn by red ink or with a red-color ballpoint pen is read, as shown in FIG. 7(c), the reflectivity is higher when the original is illuminated only in red-light wavelength range, and the signal level as adjusted is considerably higher than that for white light (on the left-hand side).

The signal level for red light (on the righthand side) is shown as the same as the signal level produced when the original is white because the illuminating light and the color of the original are of the same wavelength and of a high lightness. Depending on the type of the writing instrument used and the condition in which it is used, the signal characteristics vary widely for those lights which are perceived as red by human eyes. Therefore, it is preferable to prepare originals with a writing instrument available from the manufacturer of the two-color copying machine for effective color conversion.

FIG. 7(d) shows the characteristics of an original 122 of a blue color as another background color. When a blue portion of the original is read with red light, substantially no reflected light is produced and the signal level approximates zero level. Under white light, colors other than blue are absorbed so that the signal level is of an intermediate value. Where colors other than blue are used on the original, the signal level similarly depends on the lightness and hue. With respect to gray among achromatic colors, the signals level is higher than black.

Figure 8:
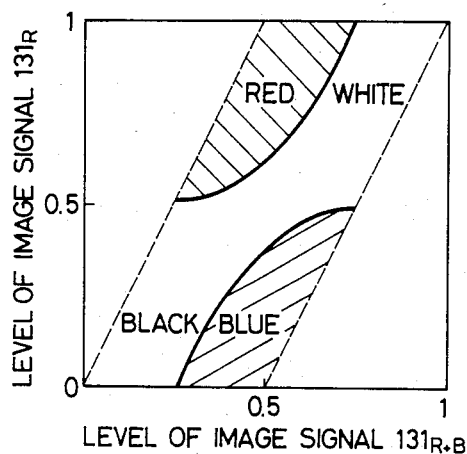
FIG. 8 is a diagram showing a color distribution of two image signals.

As described above, the image signal $131_R$ produced in the first scanning operation and the image signal $131_{R+B}$ produced in the second scanning operation vary in level depending on the color in the portion of the original which is read. By expressing the signal levels on vertical and horizontal axes, for example, a color distribution diagram can be plotted. FIG. 8 is a highly simplified color distribution diagram. In FIG. 8, the level of the image signal $131_{R+B}$ is converted from 0 (lowest) to 1 (highest) and represented on the horizontal axis, and the level of the image signal $131_R$ is similarly represented on the vertical axis. The level of the image signal $131_{R+B}$ in each of the red and blue portions of the original is tentatively represented as 0.5.

Since each color of the original can be defined by the two image signals $131_{R+B}$ and $131_R$, these can be used as addressing information for color conversion. The color conversion ROM 134 reads a table of contents corresponding to the addressing information, and issues the contents at the address as the image signal 135R relating to red or the image signal 135B relating to black (lightness information on a color other than red).

Line Density Conversion

The two image signals 135R and 135B are then corrected for a reading ghost by a ghost correcting unit 130 and thereafter subjected to line density conversion by a line density converter 137 in the color signal processing circuit 128. The term "line density conversion" means the conversion of an image signal read by the image sensors 21A and 21B and having a line density of 12 dots/mm to an image signal according to a magnification selected by the magnification selecting button 95 (FIG. 2). For example, when the selected magnification is 100% (equal size), 12 dots/mm are converted to 8 dots/mm. When the selected magnification is 75% (size reduction to ¾), 12 dots/mm are converted to 6 dots/mm. When the selected magnification is 125% (size enlargement to 5/4), 12 dots/mm are converted to 10 dots/mm. The image signal 138B for recording black which has been subjected to the line density conversion is supplied to a halftone image signal generating circuit 139.

Generation of black halftone image signal

The halftone image signal generating circuit 139 serves to convert the image signal 138B to a three-valued image signal for digital recording and to generate an image signal reconstructed in an N×N dot matrix so that 15 tones can be expressed by the three-valued image signal. The three-valued signals correspond to recording densities of white, gray, and black. In the copying machine of this embodiment which employs the thermal transfer recording system and can only effect two-valued recording, the diameter of an output dot is varied in two states by changing the energy of a thermal pulse applied from the thermal head to the ink donor sheet, thus expressing the density of black in two pseudostates.

Figure 9:
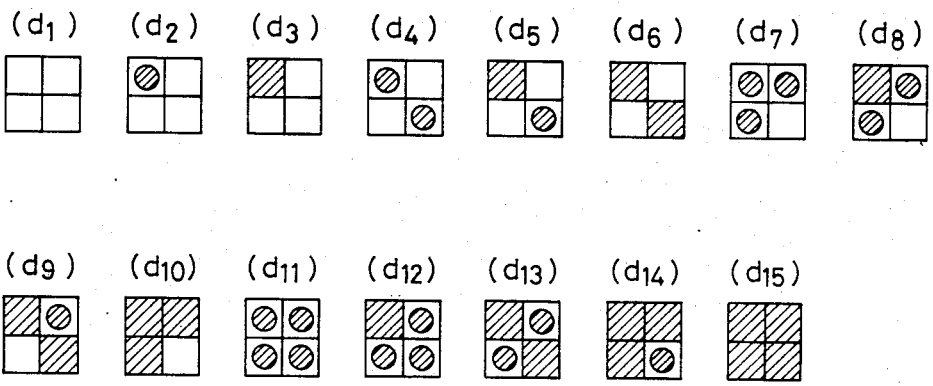
FIG. 9 is a view of fifteen tones each expressed by a 2×2 dot matrix.

FIG. 9 shows 15 tones each expressed by a 2×2 dot matrix where the numeral N is 2. The recording density becomes higher from $d_1$ toward $d_{15}$. The hatched circle indicates a printed dot of small diameter (hereinafter referred to as a half dot), the hatched square a printed dot of large diameter (hereinafter referred to as a full dot), and the white square an unprinted dot (hereinafter referred to as a white dot). The dots in the 2×2 dot matrix are arranged with no clearance between them on the recording surface, thus achieving the 15-tone expression in black. The copying machine of the represent embodiment employs the three-value process for generating a black halftone image signal 141B of the 2×2 dot matrix.

Figure 10:
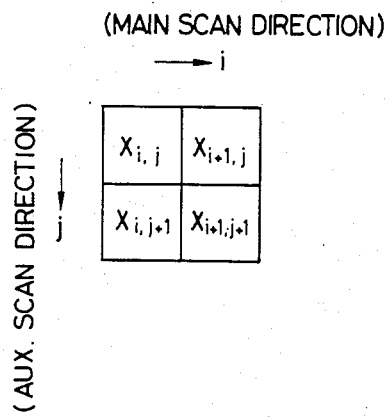
FIG. 10 is a diagram of the positional relationship of four pixels in a 2×2 dot matrix used in a three-value process.

FIG. 10 shows the relationship between the four pixels $X_{i,j}$ through $X_{i+1,j+1}$ in the 2×2 dot matrix produced by the three-valued signals process. In FIG. 10, the main scanning direction for reading and recording images as indicated by i, and the auxiliary scanning direction for reading and recording images is represented by j. The four pixels $X_{i,j}$ through $X_{i+1,j+1}$ are quantized by different threshold levels, respectively. For example, the image signal 138B for the pixel $X_{i,j}$ is expressed by the 15-tones $l_1$ through $l_{15}$ as follows:

(i) Full dot $$X_{i,j} = l_1 - l_4, l_6 - l_8, l_{10}, l_{11}, l_{13}$$

(ii) Half dot $$X_{i,j} = l_5, l_9, l_{12}, l_{14}$$

(iii) White dot $$X_{i,j} = l_{15}$$

Figure 11:
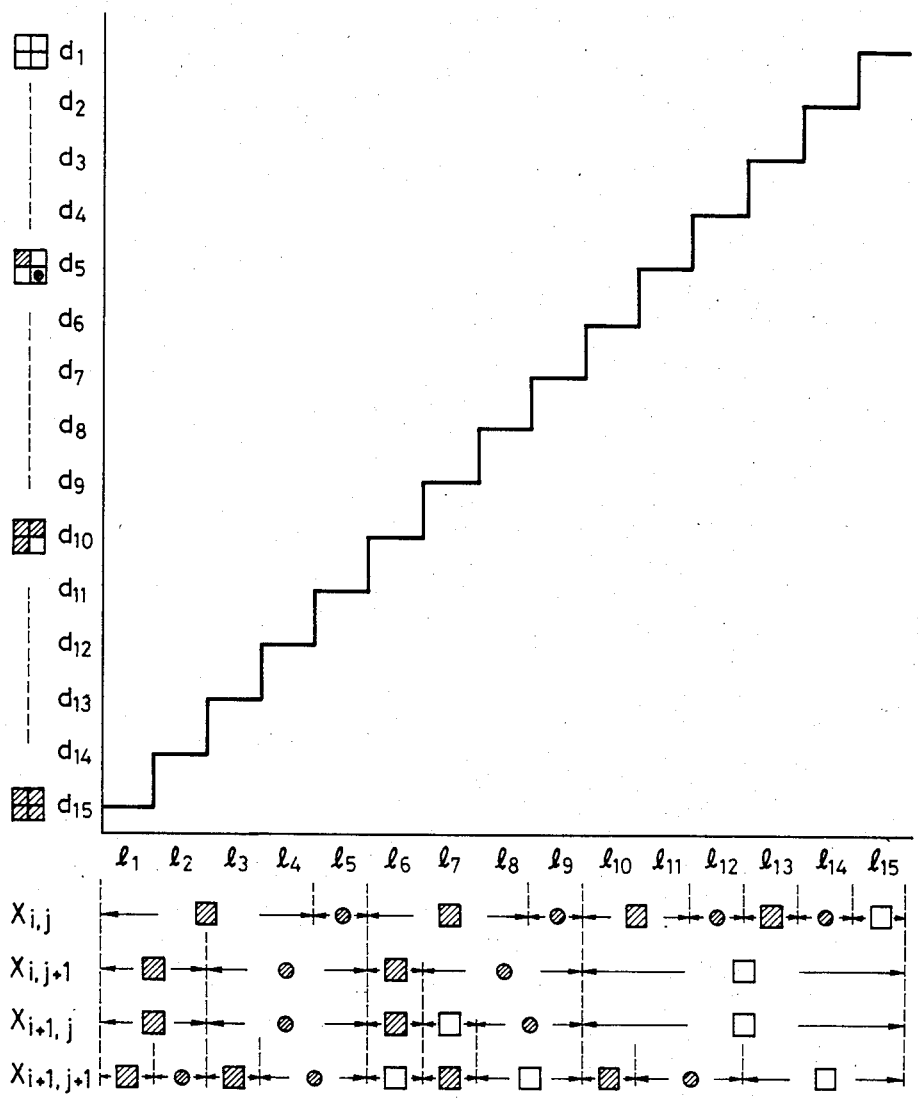
FIG. 11 is a diagram showing the relationship between the fifteen dot matrixes and tones.

All of the pixels are expressed as shown in FIG. 11. The horizontal axis of FIG. 11 represents the tones $l_1$ through $l_{15}$, with the tone $l_1$ being darkest and the tone $l_{15}$ being brightest. The vertical axis of FIG. 11 indicates the densities d1 through d15 expressed by the 2×2 dot matrix. For example, when the image signal 138B is of the darkest tone $d_1$, the pixels $X_{i,j}$ through $X_{i+1,j+1}$ are all full dots, thus producing the density d15.

Figure 12:
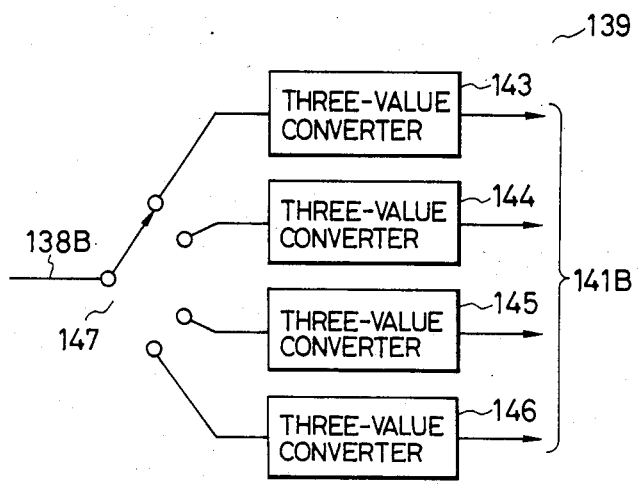
FIG. 12 is a block diagram of a halftone image signal generator circuit.

FIG. 12 schematically shows a halftone image signal generating circuit composed of three-valued converters 143 through 146 each comprising comparators and logic circuits. The first three-valued converter 143 has eight digital comparators having eight threshold levels for an image signal 138B corresponding to the pixel $X_{i,j}$. By logically processing the results of the comparison, the first three-valued converter 143 issues a black halftone image signal 141B representative of a full dot, a halfdot, or a white dot. The second three-value converter 144 has four digital comparators having four threshold levels for the pixel $X_{i,j+1}$, and issues a three-value black halftone image signal 141B. The third three-value converter 145 has five digital comparators, and the fourth three-value converter 146 has nine digital comparators. The converters 145 and 146 issue black halftone image siqnals 141B respectively for the pixels $X_{i+1,j}$ and $X_{i+1,j+1}$.

A switching circuit 147 supplies the image signal 138B alternatively to the three-value converters 143 through 146. In the ith line, the first and second three-value converters 143 and 144 are selected for each pixel. In the (i+1)th line, the third and fourth three-value converters 145 and 146 are selected for each pixel. Each of the black halftone image signals 141B is a three-valued image signal which selectively represents any one of the 15 densities per matrix when it is recorded as a 2×2 dot matrix.

Out of the image signal 138R for recording red and the black halftone image signal 141B for recording black, both generated by the image signal processing circuit 128, the image signal 138R is supplied to an image signal memory 149 which is a delay circuit for adjusting a delay of the time required after black is recorded by the black thermal head 38 until red is recorded by the red thermal head 49. A red image signal 151R read out of the image signal memory 149 upon elapse of a prescribed delay time is supplied to a red image signal processing circuit 152. The black halftone image signal 141B is supplied, without being delayed, to a black image signal processing circuit 153.

External interface

The copying machine has an interface controller 155. The black halftone image signal 141B and the red image signal 151R can be transmitted as a series signal through the interface controller 155 to an external device (not shown). More specifically, the interface controller 155 may have an external transmitting terminal (not shown) for connection through a modem to a telephone circuit, an interoffice communication circuit, or a radio communication circuit. Conversely, the copying machine may be used as a recorder of the external device by providing a terminal for receiving a series two- or three-valued image signal, supplying the received signal through a modem or the interface controller 155 to the image signal processing circuits 152 and 153 and energizing the thermal heads 38 and 49 for recording. At circuits 152 and 153, the signal is processed as described below.

Where the black halftone image signal 141B and the red image signal 151R are to be processed by the external device, the recording operation of the external device may not be carried out at the same speed because of synchronism with the circuit or interrupt processing. However, the image reader assembly 1 of FIG. 1 continuously reads the original with the image sensor 21. Therefore, the interface controller 155 of the copying machine has line buffers for temporarily storing the image signals, and controls the auxiliary scanning effected by the scanner unit 13A depend on the number of the stored signals.

However, the variable control of the auxiliary scanning speed is responsible for causing the scanner unit 13A to vibrate mechanically, resulting in a reading position error. To prevent the scanner unit from vibrating mechanically, the scanner unit 13A is driven at an equal degree of acceleration for a certain period of time. For such a driving mode, it is necessary to detect the amount of untransmitted image signals due to the difference between the reading speed and the transmitting speed for proper control of the driving of the scanner motor 58.

Figure 13:
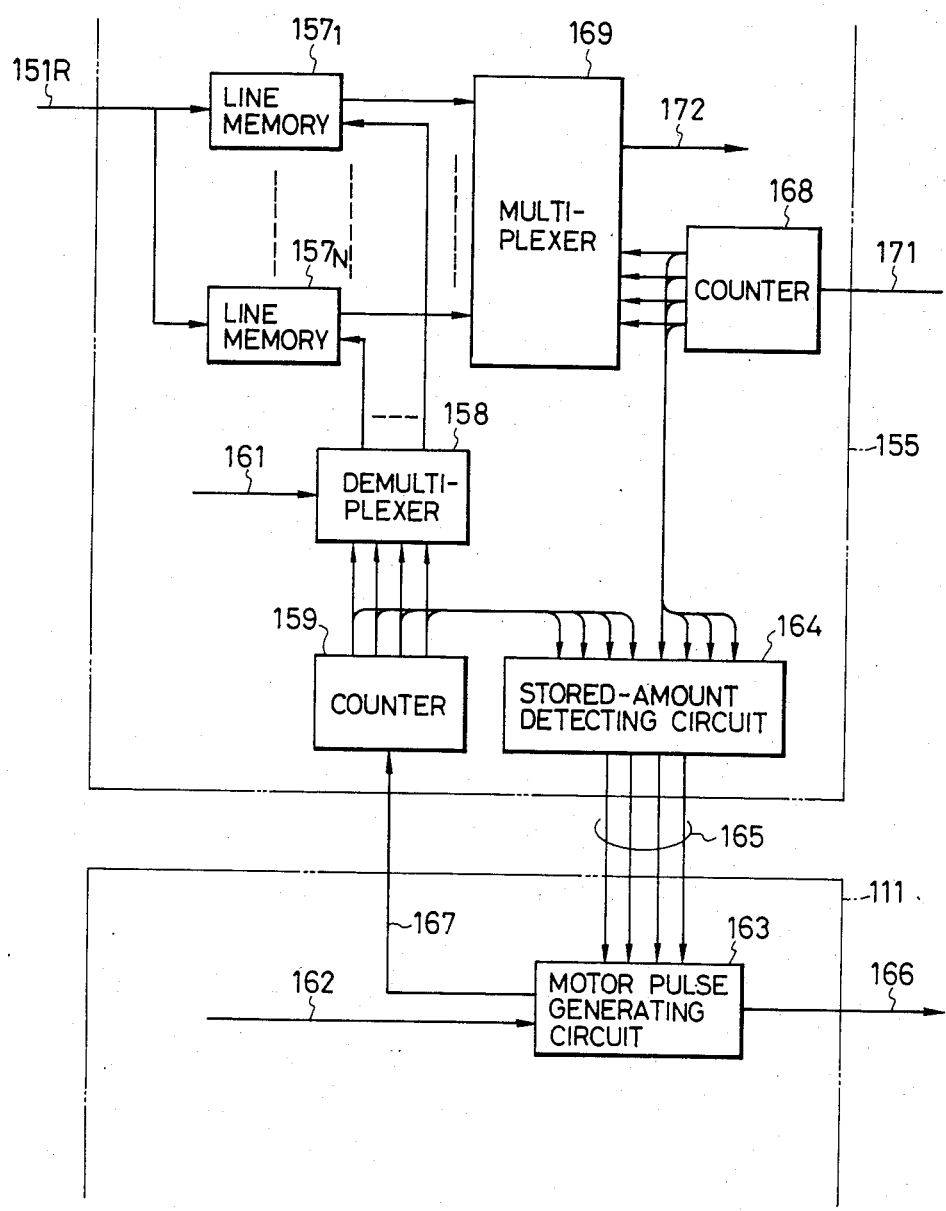
FIG. 13 is a block diagram of an interface control unit and a sequence control unit.

FIG. 13 shows such portions of the interface controller 155 and the sequence controller 111 which are arranged to effect such control. For the sake of brevity, only the instance in which the red image signal 151R is transmitted to the external device will be described. The interface controller 155 has a plurality of line memories $157_1$ through $157_N$ serving as buffer memories. A demultiplexer 158 selects one of the line memories $157_1$ through $157_N$ depending on a count value issued from a counter 159, and operates in synchronism with write pulses 161 issued from the image reader assembly 1 (FIG. 1) for writing one line of red halftone image signals 151.

A line synchronizing signal 162 issued from the image reader assembly 1 is supplied to a motor pulse generating circuit 163 in the sequence controller 111. The motor pulse generating circuit 163 is also supplied with signals 165 indicative of the number of signals stored in the line memories $157_1$ through $157_N$. Signals 165 are generated by a stored-amount detecting circuit 164 in the interface controller 155. Depending on the stored number of the red image signals 151R, namely, the total number of stored lines, the motor pulse generating circuit 163 frequency-divides the line synchronizing signal 162 and issues motor driving pulses 166 and write request pulses 167. The motor driving pulses 166 are supplied to the motor driving circuit 116. Each time a motor driving pulse 166 is generated, the scanner motor 58 moves the scanner unit 13A for auxiliary scanning of one line.

The write request pulse 167 is a signal for requesting the demultiplexer 158 to write the red halftone image signals 151R, the signal being supplied to the counter 159 which counts up by one. The count value of the counter 159 is delivered to the stored-amount detecting circuit 164 and the demultiplexer 118. Depending on the supplied count value, the demultiplexer 114 successively selects the line memories $157_1$ through $157_N$ to enable them to write the red halftone image signal 151R in synchronism with the write pulse 161 each time one line is subjected to auxiliary scanning.

The interface controller 155 also has a counter 168 for reading an image signal and a multiplexer 169. The counter 168 is supplied from the external device or the like with a readout request signal 171 for requesting readout for one line. Each time the readout request signal 171 is supplied, the counter 168 counts the signal, and the count value thereof is fed to the multiplexer 169 and the stored-amount detecting circuit 164. The multiplexer 169 is supplied with parallel red halftone image signals 151R, each for one line, from the line memories $157_1$ through $157_N$, respectively, and issues the image signal of the line memory selected by the count value of the counter 168 as an output signal 172. The line memories $157_1$ through $157_N$ are selected in the same order in which they are selected by the demultiplexer 158.

The stored-amount detecting circuit 164 ascertains the difference between the counts of the counters 159 and 168 for detecting the number of stored signals. The stored number of signals is expressed by S, and the normal speed of the scanner unit 13A for auxiliary scanning is set to M stages ($M \geq 2$) depending on the stored number of signals. There are therefore established $(M-1)$ accelerating conditions and $(M-1)$ decelerating conditions, and the scanner unit is accelerated and decelerated under the selected one of the accelerating and decelerating conditions. The M normal speeds, denoted $V_1$ through $V_M$, corresponding to the stored amount S of signals, the positive accelerations, denoted $\alpha_1$ through $\alpha_{M-1}$, and the negative accelerations, denoted $\beta_1$ through $\beta_{M-1}$, are related to each other as shown in the following Table 1:

TABLE 1

| Stored amount | Normal Speed | Acceleration | Deceleration |
|---|---|---|---|
| $S_0 \leq S < S_1$ | $V_1$ | $\alpha_1$ | $\beta_1$ |
| $S_1 \leq S < S_2$ | $V_2$ | $\alpha_2$ | $\beta_2$ |
| $S_2 \leq S < S_3$ | $V_3$ | $\alpha_3$ | $\beta_3$ |
| . | . | . | . |
| . | . | . | . |
| . | . | . | . |
| $S_{M-2} \leq S < S_{M-1}$ | $V_{M-1}$ | $\alpha_{M-1}$ | $\beta_{M-1}$ |
| $S_{M-1} \leq S < S_M$ | $V_M$ | | |

If the number of signals stored in all of the line memories $157_1$ through $157_N$ is $S_1 \leq S < S_2$, then the normal speed if $V_2$. For changing from the normal speed $V_1$ to the higher normal speed $V_2$, the accelerating condition is controlled according to the positive acceleration $\alpha_1$ which is selected. Conversely, for changing from the normal speed $V_3$ to the lower normal speed $V_2$, the decelerating condition is controlled according to the negative acceleration $\beta_2$ selected.

Figure 14:
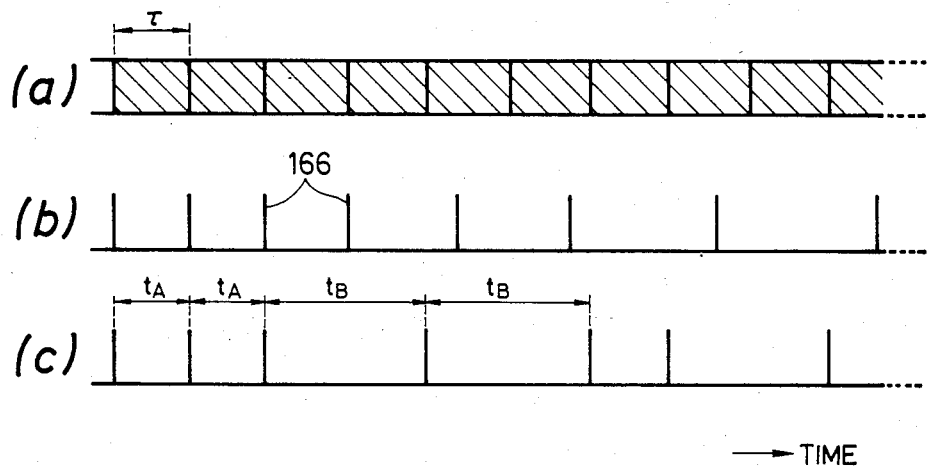
FIG. 14 is a diagram showing the timing relationship between an image reader and an external device.

FIG. 14 shows the timing relationship between the image reader assembly and the recorder of the external device. In the image reader assembly, the image sensor 21 reads the image at a prescribed period $\tau$ (FIG. 14(a)). The generation of the motor driving pulses 166 (FIG. 14(b)) depends on the number of the stored image signals, with the result that the sampling of the image signals is controlled. FIG. 14(c) illustrates line recording intervals in the recorder of the external device. The illustrated recorder establishes two recording speeds depending on the ratio of output dots in one line. Where there are few output dots, one line is printed in the time $t_A$ (for example, 2.5 ms), and where there are many output dots, the thermal head is driven discretely to print one line in the time $t_B$ (for example, 5.0 ms). The intervals at which the motor driving pulses 166 are generated are controlled to change gradually as shown in FIG. 14(b) even when the line recording speeds vary at small intervals as shown in FIG. 14(c).

FIG. 15 illustrates an actual implementation of such speed control. If the auxiliary scanning speed varies from the normal speed $V_1$ to the other normal speed $V_2$ as shown FIG. 15(a), there is the accelerating condition $\alpha_1$ for a time interval $\Delta t$ between these two normal speeds. Therefore, the scanner unit is continuously displaced as shown in FIG. 15(b) to avoid any readout error. The readout control as described above for delivering image signals to the external device can also be employed in the two-color recording assembly 2 (FIG. 1) of the two-color copying machine.

Signal Processing of Image Signal Reproducing Circuit

The black halftone image signal 141B supplied to the black image signal processing circuit 153 is applied to a black image signal processing circuit 181.

The black image signal reproducing circuit 181 writes every one line of black halftone image signals 141B serially in a memory thereof when the normal mode or red-cut mode is selected by the mode selector button 94 (FIG. 2). Reproducing circuit 181 also reads out the stored signals in a forward or reverse direction depending on the direction in which the scanner unit 13A (FIG. 1) is scanned. More specifically, as described above, the scanner unit 13A reads image signals on forward and return strokes when a plurality of copies are produced from one original. Since the scanner unit reads the image signals in a forward sequence on its forward stroke and in a reverse sequence on its return stroke, the image recorded on the return stroke would be a mirror image unless the image signals were rearranged. Therefore, the signals are read out of the memory in the image signal reproducing circut in the forward direction on the forward stroke and in the reverse direction in the reverse stroke. However, such rearrangement of the image signals will not be required if only one copy is produced from the original or if the image signals are received from an external receiving terminal.

The black halftone image signals 141B read out of the memory are converted from the serial form to the parallel form for transfer to the black thermal head 38. Blocks of parallel image signals are successively generated. Each blocks of parallel image signals correspond to heating body units that are driven for one line or discretely. These parallel image signals are then delivered to a recording-width control circuit to cut off those black halftone image signals 141B which correspond to a region other than the recording region of the black thermal head 38 and a region for contact with the black ink donor sheet 24. To effect such signal cutoff, the sequence controller 111 issues size information supplied from the paper size switch 84 to the black image signal reproducing circuit 182. The recording width is limited, depending on the size of the recording paper, to prevent the black back roll 39 (FIG. 1) from being smeared when the unnecessary region of the black ink donor sheet 24 is heated.

The black halftone image signals from the recording-width control circuit is then supplied to a recording-density selecting circuit. That selecting circuit controls the voltage or pulse duration of an applied pulse for printing each dot in three states depending on the recording density of black commanded by the control panel 73. The black halftone image signal 183B thus processed is then supplied to a black thermal-storage correcting circuit 184.

When the full black mode is selected by the mode selector button 94, the black image signal processing circuit 181 is supplied with the combination of the black and red image signals 138R and 141B, which are processed in the foregoing manner as the black image signal that is then supplied to the black thermal-storage correcting circuit 184.

As described above, the image signal memory 149 is a delay memory for effecting two-color recording without generating a color shift on the recording sheet which passes through both the black thermal head 38 and the red thermal head 49. In the two-color copying machine of the present embodiment, the thermal heads 38 and 49 are spaced from each other by 100 mm, and the image signal memory 149 has a capacity of about 16 Mbits in relation to the running speed of the recording sheet.

The image memory 149 is supplied with the red image signal 138R only when the normal mode is selected by the mode selector button 94. The red image signal 151 read out of the image signal 149 is supplied to a red image signal processor 185 in the red image signal processing circuit 152. The red image signal processor 185 effects the same signal processing as that of the black image signal processor 181 and supplies a resultant red image signal 186 to a red thermal-storage correcting unit 187. A recording-density selecting circuit in the red image signal processor 185 controls the peak values (or pulse duration) of an applied pulse for the red image signal in two stages depending on the red recording density commanded by the control panel 73.

Red Thermal Storage Correction

The apparatus for thermally recording images with an ink donor sheet or the like, such as the two-color copying machine of the present embodiment, mostly uses a thermal head as a recording head. The thermal head is composed of an array of heating body units or heating elements. Since the thermal head generates thermal energy at the time of printing an image, the image may be deteriorated by the generated thermal energy due primarily to thermal storage of the thermal head. The thermal head has different thermal storage conditions depending on the past energizing patterns of the individual heating body units. The heating body units have varying temperatures due to heat transfer between themselves and the other surrounding heating body units. In order to print full dots or half dots at their prescribed recording densities, it is necessary to slightly adjust the pulse durations and peak values of pulses applied to the heating body units.

In the two-color copying machine of the invention, the red thermal head 49 effects two-valued printing (for full and half dots), and the black thermal head 38 effects three-valued printing (for full, half, and white dots). Therefore, the process of thermal-storage correction varies slightly in these different printing modes. First, the thermal-storage correction by the red thermal-storage correcting unit 187 will be described, and then the black thermal-storage correcting unit 184 will be added.

Figure 16:
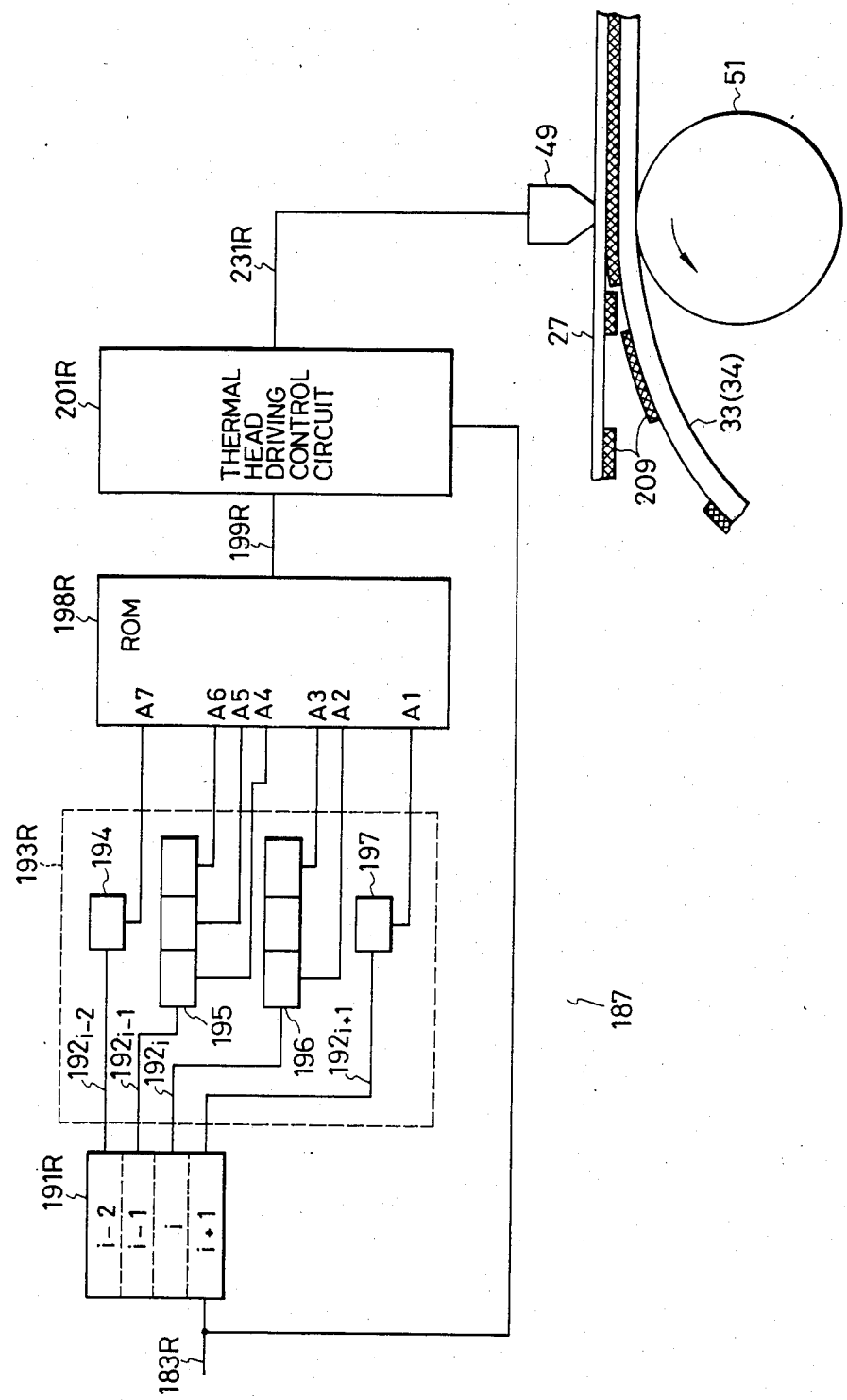
FIG. 16 is a block diagram of a circuit arrangement of a red-color thermal storage correcting unit and a red-color recording assembly.

FIG. 16 shows the red thermal-storage correcting unit and a red recording assembly coupled thereto. The red thermal-storage correcting unit 187 has a buffer memory (storage means) 191R for recording four lines (four rasters) of red image signals 183R from the image signal processing circuit. In the following description, the line being printed is referred to as an i line, the line to be printed next (one line after) is referred to as an (i+1) line, the line printed immediately before (one line before) is referred to as an (i−1) line, and the line printed before the (i−1) line (two lines before) is referred to as an (i−2) line. The buffer memory 191R stores image data of the red image signals 183R for the (i+1) through (i−2) lines. Line image data $192R_{i+1}$ through $192R_{i-2}$ are read, one bit by one bit, from the buffer memory 191R in synchronism with a clock signal (not shown) and are supplied to a latch circuit 193R.

The latch circuit 193R has four latches 194 through 197 which operate in synchronism with the clock signal. The image data $192R_{i-2}$, two lines before, is delayed one bit by a delay element (not shown) and supplied to the latch 194. The image data $192R_{i-1}$, one line before, and the image data $192R_i$ to be currently printed, are supplied to the latch 195 or the latch 196 which are composed of a three-stage shift register. The image data $192R_{i+1}$, one line after, is similarly delayed one bit by a delay element (not shown) and supplied to the latch 197.

The image data held in the latch 194 is supplied to an addressing terminal A7 of a ROM (Read-Only Memory) 198R. The 3-bit image data held in the latch 195 is converted from the serial form to the parallel form, and then supplied, successively from the oldest data item, to addressing terminals A6 through A4 of the ROM 198R. The 3-bit image data held in the latch 196 is converted from the serial form to the parallel form. The oldest data item is supplied to an addressing terminal A3 of the ROM 198R, and the newest data item is supplied to another addressing terminal A2 of the ROM 198R. The image data held in the latch 197 is supplied to an addressing terminal A1 of the ROM 198R.

Figure 17:
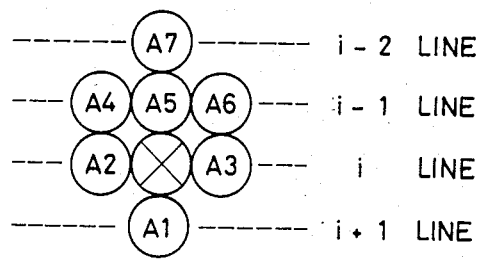
FIG. 17 is a diagram showing the relationship between printing positions of image data items issued from a latch circuit and the addressing terminals of a ROM.

FIG. 17 is illustrative of the relationship between the printing positions for the image data issued from the latch circuit 193 and the addressing terminals of the ROM 198R. The image data marked with "x" is data of interest for which the printing energy is computed.

The ROM 198R computes the thermal storage condition of the unit heating body corresponding to the data of interest with these surrounding image data items used as addressing information. The following Table 2 shows a conversion table written in the ROM 198R:

TABLE 2

| Image data (addressing terminal) | | | | | | | Applied data duration data (ms) |
| --- | --- | --- | --- | --- | --- | --- | --- |
| A1 | A2 | A3 | A4 | A5 | A6 | A7 | |
| 0 | 0 | 0 | 0 | 0 | 0 | 0 | 1.2 |
| 0 | 0 | 0 | 0 | 0 | 0 | 1 | 1.1 |
| 0 | 0 | 0 | 0 | 0 | 1 | 0 | 1.1 |
| 0 | 0 | 0 | 0 | 0 | 1 | 1 | 1.05 |
| . | . | . | . | . | . | . | . |
| 0 | 1 | 1 | 1 | 1 | 1 | 1 | 0.4 |
| 1 | 0 | 0 | 0 | 0 | 0 | 0 | 1.2 |
| 1 | 0 | 0 | 0 | 0 | 0 | 1 | 1.15 |
| 1 | 0 | 0 | 0 | 0 | 1 | 0 | 1.15 |
| 1 | 0 | 0 | 0 | 0 | 1 | 1 | 1.1 |
| . | . | . | . | . | . | . | . |
| 1 | 1 | 1 | 1 | 1 | 1 | 1 | 0.8 |

The numeral "1" given as the image data (addressing terminal) indicates image data (full dot) to be printed, and the numeral "0" indicates image data (white dot) not to be printed. Depending on the duration (ms) of the pulse to be the surrounding image data applied to the unit heating body corresponding to the data of interest is determined and supplied as applied pulse duration data 199R to a thermal head drive control circuit 201R.

Figure 18:
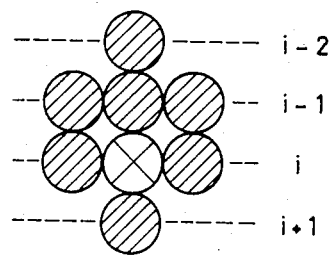
FIGS. 18 and 19 are diagrams illustrative of arrangements of image data items.

The applied pulse duration data is produced by giving a weight concerning contribution to thermal storage to each of the seven other data (reference data) positioned in surrounding relation to the data of interest marked with "x" in FIG. 17, adding the weighted data depending on the content of the image data, and converting the sum into an applied pulse duration. However, the applied pulse duration data is somewhat corrected. For example, FIG. 18 shows all of the seven image data around the data of interest marked with "x" as data to be printed (shown hatched), and no resolution problem occurs even if the size of the dot to be printed for the data of interest is increased. If the size of the dot to be printed were small, however, there would be background clearances between the printed dots, and an image of full black could not be printed. Therefore, the time duration will be selected to be longer than a pulse duration computed simply from the thermal storage condition. Table 2 shows that the printed pulse duration for the above case is 0.8 ms.

Figure 19:
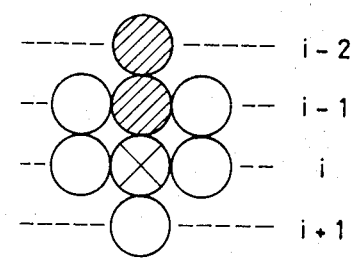

With the thermal storage correction, the pulse duration of a pulse to be applied to the unit heating body is generally longer for adjusting the printing density if the stored thermal energy is low. Even when the amount of stored thermal energy is smaller than that of FIG. 18, as shown in FIG. 19, the image data for the line following the data of interest may be unprinted data (white dot), or the image data positioned laterally of the data of interest may be unprinted data. In this case, if the printing energy were simply computed, a printing dot of relatively large diameter would be established, and the edge across which white and red change over would be blurred. To prevent this, a relatively short pulse duration is selected.

Figure 20:
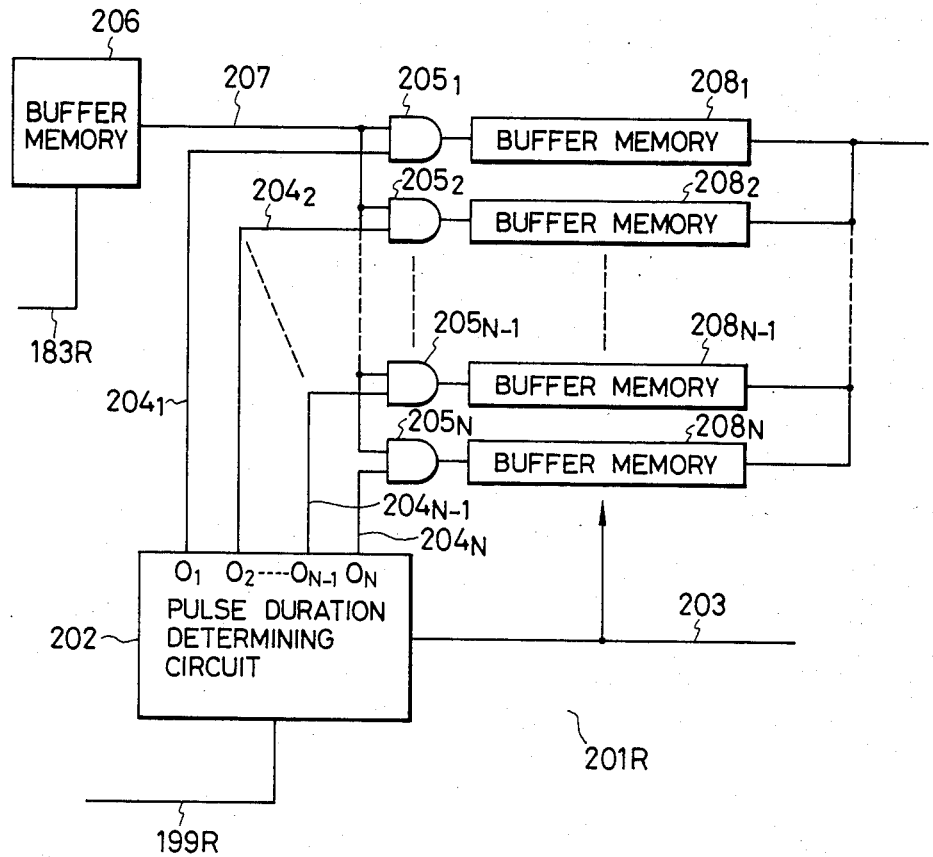
FIG. 20 is a block diagram of a portion of a thermal head drive control circuit.

FIG. 20 shows a thermal head drive control circuit for selecting a time duration for a pulse to be applied based on the printed pulse duration data. The thermal head drive control circuit, denoted 201R, includes a pulse duration determining circuit 202 which operates in synchronism with clock signal 203 for reading pulse duration data 199R, one pixel by one pixel, and issuing gate control signals $204_1$ through $204_N$ corresponding to pulse durations through output terminals $0_1$ through $0_N$. The pulse duration determining circuit 202 determines N printing pulse durations ranging from 0.4 ms to 1.2 ms for adjusting the amount of heat to be produced by each of the heating body units.

When the pulse duration is 0.4 ms, only the first gate control signal $204_1$ goes high. When the pulse duration is 0.5 ms, the first and second gate control signals $204_1$ and $204_2$ go high. As the pulse duration is longer, more gate control signals go high. When the pulse duration is 1.2 ms, all of the gate control signals $204_1$ through $204_N$ go high.

The gate control signals $204_1$ through $204_N$ are applied respectively to N 2-input AND gates $205_1$ through $205_N$, which have other input terminals supplied with image data 207 delayed by a buffer memory 206, the image data 207 corresponding to the data of interest. When high-level printing data is supplied as the image data 207, for example, and if the pulse duration is 0.4 ms, a high-level signal is issued from the first AND gate $205_1$, and low-level signals are issued from the other AND gates $205_2$ through $205_N$.

These output signals are applied respectively to N buffer memories $208_1$ through $208_N$. The aforesaid operation is repeated in synchronism with the clock signal 203 to assign and store one line of image data in each of the buffer memories $208_1$ through $208_N$ dependent on the pulse duration.

Figure 21:
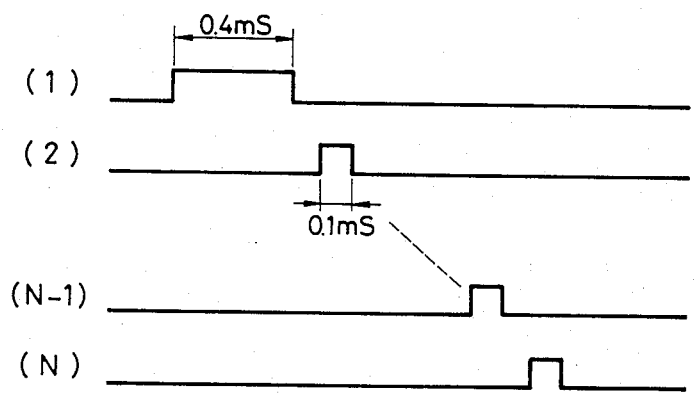
FIG. 21 is a timing chart showing printing timing.

Thereafter, the content of the first buffer memory $208_1$ is read out and set in a shift register, not shown, for the red thermal head 49 (FIG. 16). A printing pulse having a duration of 0.4 ms is generated as shown in FIG. 21(1) for printing operation at the first stage. Then, the content of the second buffer memory $208_2$ is read out and set in the shift register. A printing pulse having a duration of 0.1 ms is generated as shown in FIG. 21(2) for printing operation at the second stage. Likewise, the contents of the buffer memories $208_3$ through $208_N$ are successively read out to produce printing pulses of prescribed time durations.

Until the Nth-stage printing operation is completed (FIG. 21(N)), the red back roll 51 remains at rest, and the red ink donor sheet 27 as the thermal recording medium and the recording sheet (plain paper) 33 or 34 are stopped in the direction of auxiliary scanning. At this time, the optimum thermal energy is emitted from each unit heating body through the adjustment of the pulse duration in the N stages to allow thermally transferable ink 206 to be clearly transferred. After the Nth-stage printing operation has been finished, the red back roll 51 is scanned for one line in the auxiliary scanning operation, and the red ink donor sheet 27 and the recording sheet 33 or 34 are moved to the next printing position. The printing operation is repeated in this manner to record image data.

Black Thermal Storage Correction

Figure 22:
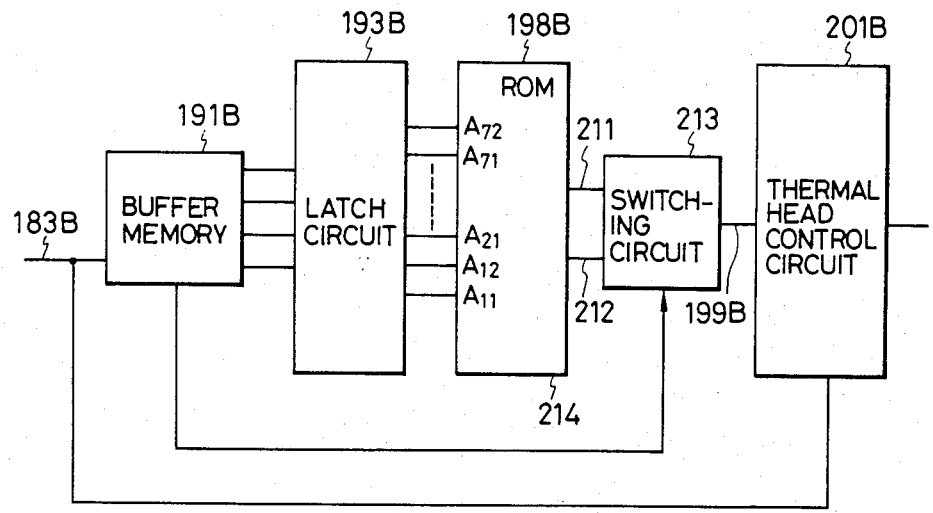
FIG. 22 is a block diagram of a black-color thermal storage correcting unit.

FIG. 22 shows a black thermal-storage correcting unit. The circuit portions having the same functions as those of the red thermal-storage correcting unit are indicated by the same reference characters in FIG. 16, except that the "R" suffix is replaced with a "B" suffix and will not be described in detail. The black thermal-storage correcting unit 184 has a buffer memory 191B for storing four lines of black halftone image signals 183B. The buffer memory 191B stores any one of full, half, and white dots for each pixel. The data stored in the buffer memory 191B is of a 2×2 dot matrix as described above.

The black thermal-storage correcting unit 184 includes a latch circuit 193B for picking up reference data for seven pixels arranged around the data of interest as shown in FIG. 17. The latch circuit 193B latches any one of three values, i.e., full, half, and white dots, of the data. Since each of the three values is expressed by a 2-bit signal, the addressing information for the ROM 198B must be twice that for the ROM 198R shown in FIG. 16. The ROM 198B computes a contribution factor of the reference data with respect to the data of interest by adding weights of the respective reference data to determine the duration of a pulse to be printed. For the half dots of the reference data, however, a weight produced by multiplying that of the full dot by 70% is employed. The ROM 198B stores two pulse durations, using a high-order bit 211 and a low-order bit 212, for full-dot and half-dot data of interest, and supplies the bits 211 and 212 simultaneously to a switching circuit 213 depending on the addressing information.

The switching circuit 213 is supplied with image data 214 corresponding to the data of interest from the buffer memory 191B. When the supplied data is for a full dot, the high-order bit 211 is selected and supplied as printing pulse duration data 199B to a thermal head drive control circuit 201B. When the image data 214 corresponding to the data of interest is for a half-dot, the low-order bit 212 is selected and issued as printing pulse duration data 199B. The thermal head drive control circuit 201B effects finer pulse duration control than the red thermal-storage correcting unit 187 (FIG. 16) for driving the black thermal head 38 (FIGS. 1 and 3) since there are more pulse durations that can be selected as the printing pulse duration data 199B.

For the thermal storage correction of the thermal heads 38 and 49 as described above, it is necessary that the substrate temperature of the thermal heads be kept in a prescribed temperature range. To achieve such temperature control, the thermal heads 38 and 49 are associated with heat radiators and motordriven fans 216 and 217. To the substrates of the red thermal head 49 and the black thermal head 38 there are respectively attached red and black thermistors 218 and 219 for measuring the temperatures of the substrates. When the temperature of the substrate of the red thermal head 49 exceeds a certain temperature, the sequence controller 111 rotates the fan 216 to cool the substrate. The substrate of the black thermal head 38 is similarly cooled by the fan 217.

Feeding of Recording Sheet and Recording Operation

When the start button 81 is depressed and there is no malfunction in the copying machine, the sequence controller 111 supplies a drive signal to a sheet feed motor driving circuit 221 to energize the sheet feed motor 59 with the scanner unit 13A set in the home position. As the sheet feed motor 59 is energized, the recording sheet 33 or 34 starts being fed from the paper feeder 31 or 32 selected by the recording sheet selector switch 84 (FIG. 2). The paper feeders 31 and 32 are selected by two electromagnetic clutch driving circuits 222 and 223 and two electromagnetic clutches 224 and 225. More specifically, when the operator selects the upper paper feeder 31 with the recording sheet selector switch 84, the sequence controller 111 energizes the upper electromagnetic clutch 224 through the upper electromagnetic clutch driving circuit 222 to transfer the drive force of the sheet feed motor 59 to the paper feed roll 61. When the operator selects the lower paper feeder 32, the sequence controller 111 energizes the lower electromagnetic clutch 225 through the lower electromagnetic clutch driving circuit 224 to transfer the drive force of the sheet feed motor 59 to the other paper feed roll 62. In the following description, it is assumed that the upper paper feeder 31 is selected to feed an A4-size recording sheet in its longitudinal direction.

When the leading end of the recording sheet 33 fed out of the upper paper feeder 31 moves past the register roll 63, the leading end of the recording sheet 33 is detected by a register sensor 227 (FIG. 3) disposed immediately behind the register roll 63. At the same time, the sequence controller 111 de-energizes the upper electromagnetic clutch 224 to stop the driving of the paper feed roll 61. Thereafter, the recording sheet 33 is fed by the register roll 63.

Upon starting to feed the recording sheet 33 from the upper paper feeder 31, the sequence controller 111 starts measuring time. If the register sensor 227 does not detect the leading end of the recording sheet within a prescribed period of time, then the sequence controller 111 determines that a sheet feed error or a paper jam has occurred, and de-energizes the scanner motor 58 and the sheet feed motor 5. The sequence controller 111 also delivers a signal to the control panel 73 to cause the trouble indicator 83 to flicker. The sequence controller 111 operates in the same manner if the trailing end of the recording sheet 33 is not detected upon rotation of the register roll 63 through a certain angular interval after the register sensor 227 has detected the leading end of the recording sheet 33.

The sequence controller 111 also counts drive pulses supplied from the sheet feed motor driving circuit 221 to the sheet feed motor 59 from the time when the register sensor 227 detects the recording sheet 33. When the leading end of the recording sheet 33 reaches a position immediately in front of the heating resistance bodies or heating body units of the black thermal head 38, the sequence controller 111 energizes a black motor driving circuit 229 for rotating the black printer motor 56. Therefore, the black ink donor sheet 24 starts being fed along from this time on. The black ink donor sheet 24 is fed in the above mode so as to avoid unwanted consumption of the black ink donor sheet 24.

As the black ink donor sheet 24 starts being fed, the recording sheet 33 passes between the black thermal head 38 and the black back roll 39 while being sandwiched between the black ink donor sheet 24 and the black back roll 39. Since the black ink donor sheet 24 is composed of base paper coated on one surface thereof with a thermally flowable or sublimable black ink, as described above, the black ink is fluidized or sublimed when the heating body units of the black thermal head 38 are selectively heated by the image signal 231B. That fluidized or sublimed ink is transferred to the recording sheet 33 for thermal transfer recording. The interval by which the recording sheet is fed per scanning line on the black ink donor sheet 24 delivered by the black driver roll 41 varies depending on the copying magnification selected on the control panel 73. The ratios of the available intervals are 75%:100%:125%=3:4:5.

The recording sheet 33 on which the image has been recorded passes between the black drive roll 41 and the black pinch roll 42 in superposed relation to the black ink donor sheet 24. Thereafter, the black ink donor sheet 24 changes its direction of travel through a sharp angle and is wound by the black takeup roll 44 on which a prescribed force is imposed by a slip clutch (not shown). The recording sheet 33 cannot follow the direction of travel of the black ink donor sheet 24, but is peeled off the black ink donor sheet 24 due to its own rigidity.

The peeled recording sheet 33 is guided by the recording sheet directional control member 64 toward the red thermal head 69 only when the normal mode is selected by the mode selector button 94 (FIG. 2). The sequence controller 111 continuously counts the drive pulses to detect the timing at which the leading end of the recording sheet 33 reaches the position immediately prior to the heating resistance bodies of the red thermal head 49. At this time, the sequence controller 111 energizes a red motor driving circuit 232 to rotate the red printer motor 57. From this time on, the red ink donor sheet 27 begins to be fed for thermal transfer recording in red.

The red ink donor sheet 27 is composed of base paper coated on one surface with a thermally flowable or sublimable red ink 209. The red ink 209, which is fluidized or sublimed when the heating body units of the red thermal head 46 are selectively heated by the image signal 231R, is transferred to the recording sheet 33 for thermal transfer recording. The red ink donor sheet is delivered by the red driver roll 52. The interval by which the recording sheet is fed per scanning line on the red ink donor sheet 27 varies depending on the copying magnification selected on the control panel 73.

The recording sheet 33 with the image recorded thereon is peeled off the red ink donor sheet 27 in the same manner as described above and then is discharged through the guide 65 and the three delivery rollers 66 onto the paper catch tray 67.

When the mode selector button 94 selects the full-black mode or the red-cut mode, the recording sheet directional control member 64 guides the recording sheet 33 substantially vertically upwardly. At this time, no image is recorded in red on the recording sheet 33, which is delivered through the discharge path by the three delivery rollers 66 and discharged onto the paper catch tray 67.

Detection and Handling of Paper Jam

In the vicinity of the one of the three delivery rollers 66 which is closest to the two-color recording assembly 2, there is disposed a jam sensor 234 (FIG. 3) composed of a photosensor for detecting the recording sheet. Based on the command for each of the normal, red-cut, and full-black modes, the sequence controller 111 checks the output from the jam sensor 234 to ascertain (1) whether the recording sheet 33 is detected at a prescribed timing, and (2) whether the detected recording sheet 33 passes within a prescribed period of time.

If (1) the leading end of the recording sheet 33 is not detected at the prescribed timing or (2) the trailing end of the recording sheet 33 is not detected upon elapse of the prescribed period of time after the leading end has been detected, the sequence controller 111 determines that the recording sheet 33 is jammed and stops the operation of the two-color recording assembly 2. At the same time, the sequence controller 111 delivers a signal to the control panel 73 to cause the trouble indicator 83 to flicker. If a paper jam is detected by the jam sensor 234, the user operates a jam removal lever (not shown) located in the two-color recording assembly 2 to open the space between the black thermal head 38 and the black back roll 39, and also the space between the red thermal head 49 and the red back roll 51, for easy removal of the recording sheet 33 which has been jammed.

Handling of Ink Donor Sheet

Figure 23:
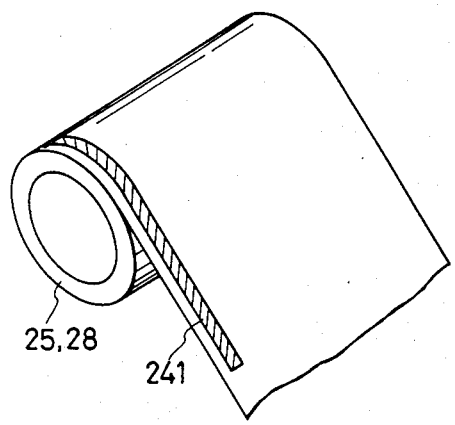
FIG. 23 is a perspective view of a supply roll, showing the manner in which the terminal end of an ink donor sheet is de- tected.

In the two-color copying machine, the two ink donor sheets 24 and 27 are unreeled from the supply rolls 26 and 29, respectively. As shown in FIG. 23, the ink donor sheets 24, 27 wound around the paper tubes 25 and 28 have an end mark 241 located on a side thereof and extending from a position near the trailing end toward the trailing end. The end mark 241 may be composed of a strip of ink coated on the base of the ink donor sheet, or may be in the form of an ink-free strip where the ink is removed from the base paper by a suitable heating means.

The copying machine has an ink donor sheet sensor 242 or 243 (FIG. 3) disposed in the ink donor sheet delivery system. When the ink donor sheet sensor 242 detects the end mark, the sequence controller 111 energizes the end indicator 106 to let the user know that the remaining length of the red ink donor sheet 27 is short. When a black ink donor sheet end sensor 243 detects the end mark, the sequence controller 111 energizes the other end indicator 105 to indicate that the donor sheet be replaced. Since the end mark 241 is long enough to cover several copies, the user may replace the ink donor sheet with a new one when replacing the original.

Figure 24:
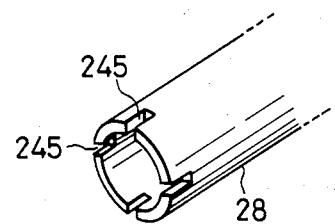
FIG. 24 is a perspective view showing an end of a paper tube.

FIG. 24 shows an end of the paper tube 28 for the red ink donor sheet. The paper tube 28 has four recesses 245 defined in the illustrated end thereof. The paper tube 25 for the black ink donor sheet has two recesses (not shown) defined in an end thereof. When the red ink donor sheet supply roll 29 is set in the two-color copying machine, the number of recesses is detected by a red donor sensor 246 by applying the output signals from four microswitches to an AND gate the microswitches being angularly spaced so as to correspond to the recesses 245. If the supply roll other than the red ink donor sheet supply roll 29 is set in the place where the supply roll 29 should be disposed, then the sequence controller 111 energizes the donor error indicator 104. If the supply roll other than the black ink donor sheet supply roll 26 is set in the place where the supply roll 26 should be disposed, then such an error condition is detected by a black donor sensor 247 and the black donor error indicator 105 is energized. The recesses defined in the paper tubes 25 and 28 can not only identify the type of the ink donor sheet, but they can couple the supply roll to a brake mechanism (not shown) for tensioning the ink donor sheets 24 and 27 when they are fed along.

The ink donor sheet can easily be charged when it is fed since it has solid ink coated on the base paper such as condenser paper. Therefore, the copying machine has a conductive brush (not shown) disposed in the feed path for the ink donor sheet and having a length equal to the width of the ink donor sheet for removing the charges from the ink donor sheet.

Figure 25:
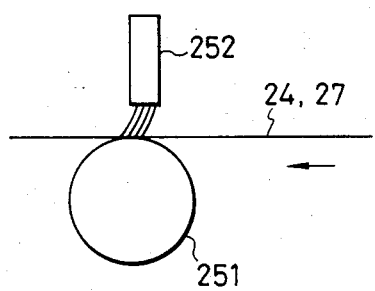
FIG. 25 is an elevational view of an image eraser.

The two color copying machine also has image erasers 248 and 249 (FIG. 3) for erasing reverse images formed on the ink donor sheets wound around the takeup rollers 44 and 55 after the images have been transferred from the ink donor sheets. The image erasers 248 and 249 are disposed between the drive rolls 41 and 52 and the takeup rolls 44 and 45, and each comprise, for example, a heater roll 251 and a brush 252 as shown in FIG. 25. The heater roll 251 is under the control of the sequence controller 111 and heats the remaining ink on the ink donor sheets 24 and 27. The heated ink is brought into contact with the brush 252, and the reverse image is destructed. Therefore, the leakage of information through the used ink donor sheets can be prevented.

By counting the drive pulses as described above, the sequence controller 111 controls the timing at which the black printer motor 56 and the red printer motor 57 are to be de-energized. When the recording operation is completely finished, the sequence controller 111 puts the two-color copying machine in a standby condition in readiness for the next copying operation.

The operation of the two-color copying machine has been described above. Now, the correction of a readout ghost in color signal processing circuit 128, which has briefly been described with reference to FIG. 3, and a mechanism for matching the two colors will be described.

Correction of Readout Ghost

Figure 26:
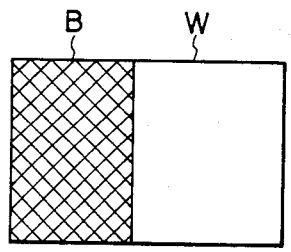
FIG. 26 is a plan view of an original to be copied.
Figure 27:
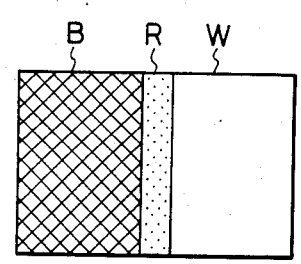
FIG. 27 is a plan view explanatory of a ghost generated with respect to the original of FIG. 26.

The readout ghost means a ghost of a color signal generated by the image reader assembly 1. For example, when a black-red copying machine reads a pattern having a left-hand side in black B and a righthand side in white W as shown in FIG. 26, a ghost in the form of a red (R) stripe may be produced along the boundary between the black and white areas. Such a ghost is produced upon reading the image for the following reasons:

(1) Chromatic aberration of the optical lens 19 in the scanner unit 13A; and (2) Difference between the threshold levels of image signals caused when converting analog image information from the photoelectric transducer into a binary signal.

For the above reasons, a ghost which is 2 bits at maximum in the main scanning direction and a ghost which is about 1 bit in the auxiliary scanning direction may be produced at the normal resolution even if the optical components are sufficiently checked and arranged at a sufficient accuracy.

To compensate for such a readout ghost, the color signal processing circuit 128 has the ghost correcting unit 30 as shown in FIG. 4. The ghost correcting unit 130 checks the relationship between a pixel (hereinafter referred to as a spotted pixel) to be corrected for a ghost and pixels (hereinafter referred to as surrounding pixels) positioned around the spotted pixel. If the relationship meets the following conditions, and when the image signal 135R of the spotted pixel is "1" (red), then this image signal is corrected into "0" (other than red):

(i) At least one of the surrounding pixels adjacent to the spotted pixel is a pixel expressing a degree of black darker than a certain density level. This condition is employed to take into account the fact that a red pixel adjacent to a black pixel may sometimes by produced due to noise; and (ii) When there are red pixels adjacent to the spotted pixel, they do not have a combined width equal to three or more successive bits in the main scanning direction, and also they do not have a combined width equal to two or more successive bits in the auxiliary scanning direction. This condition is employed to assume that a real red line is read out when the width of a straight or curved red line is larger than a certain dimension.

Figure 28:
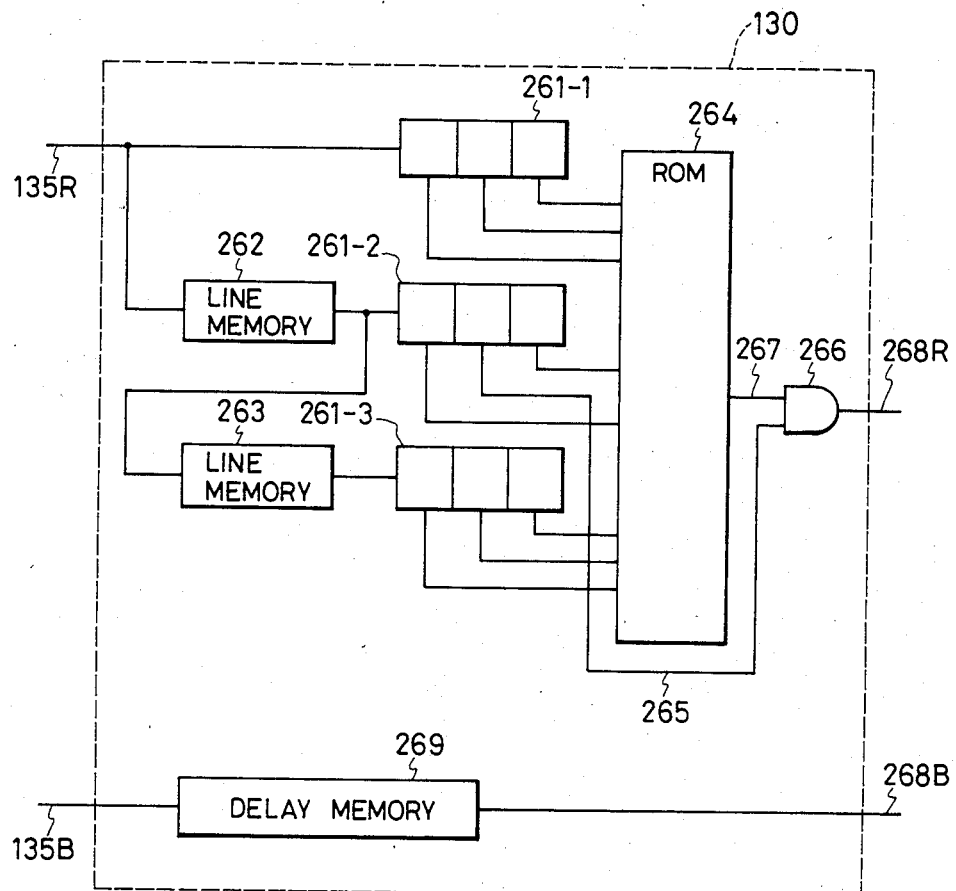
FIG. 28 is a block diagram of a ghost compensator.
Figure 30:
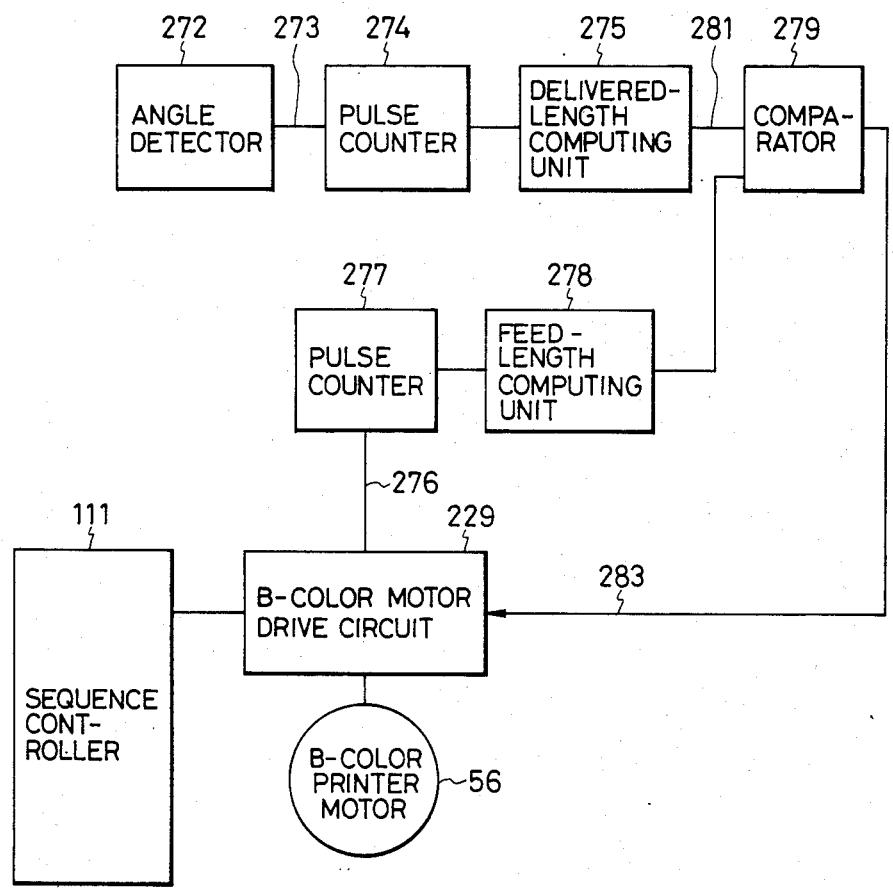
FIG. 30 is a block diagram of a circuit for controlling the feeding of a recording sheet.

FIG. 28 illustrates a circuit arrangement of the ghost correcting unit 130. The ghost correcting unit 130 is composed of first through third three-stage shift registers 261-1 through 261-3 to which red image signal 135 is suplied directly or after being delayed one line by line memories 262, 263. The shift registers 261-1 through 261-3 operate in synchronism with a clock signal (not shown) for converting the applied input signal from the serial form into the parallel form, in the same manner as the latch circuit 193R shown in FIG. 16, and supplies the converted signal to a ROM 264. However, the second stage of the second shift register 261-2 issues an image signal 265 for the spotted pixel, and the image signal 265 is applied to one of the input terminals of a two-input AND gate 266 rather than to the ROM 264.

The ROM 264 is supplied with, as addressing information, image signals of eight pixels positioned on three lines around the spotted pixel for reading ghost discriminating data 267 therefrom which meet the foregoing conditions. The ghost discriminating data 246 is a signal "1" when there is no ghost, and a signal "0" when there is a ghost. The AND gate 266 serves to AND the ghost discriminating data 267 and the image signal 265 of the spotted pixel to generate a red image signal 268R which is free from any ghost.

The image signal 135, which is indicative of the image information other than red, is divided in the 15 stages dependent on the lightness, is applied to a delay memory 269 which delays the applied signal by the delay of the image signal 268R with respect to the image signal 135R, and issues the delayed signal as an image signal 268B. The image signals 268R and 268B issued from the ghost correcting unit 130 are fed to the line density converter 137 as shown in FIG. 4.

Mechanism for Matching Two Colors

The two-color copying machine controls the delivered length of the recording sheet for maintaining proper recording positions in the auxiliary direction in each recording assembly. This control mode will be described with reference to the black recording assembly.

Figure 29:
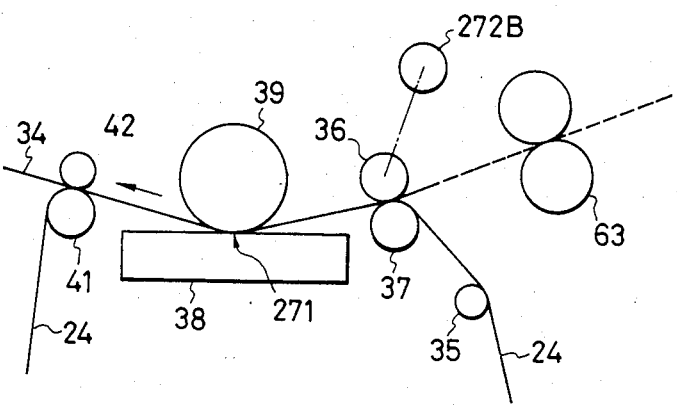
FIG. 29 is an elevational view of a system for feeding a recording sheet.

FIG. 29 shows the black recording assembly and its surrounding parts. The recording sheet 34 is fed out of the paper feeder 32 shown in FIG. 1 and positionally aligned by the register roll 63. Then, the recording sheet 34 is fed by the pair of feed rolls 36, 37 until the leading end of the recording sheet 34 reaches a position immediately above a recording portion 271 (where the unit heating bodies or heating resistance bodies are positioned) of the black thermal head 38. The delivery of the recording sheet is controlled by the black printer motor 34 which is driven under the control of the sequence controller 111 and the black motor driving circuit 229.

At the time the leading end of the recording sheet 34 reaches the aforesaid position above the recording portion 271, the feed rolls 36 and 37 are inactivated. The feed rolls 36 and 37 are thereafter rotated as the recording sheet 34 is delivered by the ink donor sheet 24. The feed roll 38 held in direct contact with the recording sheet 34 and is coupled to an angle detector 272B which may typically be a rotary encoder. Detector 272B issues a pulse signal 273 depending on the delivered length of the recording sheet 34. The pulse signal 273 is counted by a pulse counter 274, and the delivered length of the recording sheet 34 is computed by a delivered-length computing unit 275.

Drive pulses 276 generated by the black moto driving circuit 229 are counted by another pulse counter 277. A feed-length computing unit 279 computes a length by which the ink donor sheet 24 is fed based on the count of the pulse counter 277. A comparator 279 compares a delivered-length signal 281 indicative of the delivered length of the recording sheet 34 and a feedlength signal 282 indicative of the length of the ink donor sheet 24 which has been fed. If there is a difference between the compared signals, the difference is fed back as an error signal 233 to the black motor driving circuit 229. As a result, the black motor driving circuit 229 increases or reduces the number of generated drive pulses 276, depending on the excessive or insufficient delivery of the recording sheet 34, for thereby controlling the length of feed of the ink donor sheet 24.

The same delivery control as above is carried out in the red recording assembly. Therefore, the position where the image data is recorded on recording sheet 34 can be monitored by the angle detectors in the respective recording assemblies for highly accurate delivery control and prevention of a color shift. The delivery control operations in the black and red recording assemblies may be effected together for equalizing the delivery speeds in the recording assemblies.

The two-color copying machine of the foregoing embodiment can not only produce high-quality copies images with halftone expressed, but also deliver an image to another electronic device through the image reader assembly and employ the two-color recording assembly as an output device for a computer.

First Modification

Figure 31:
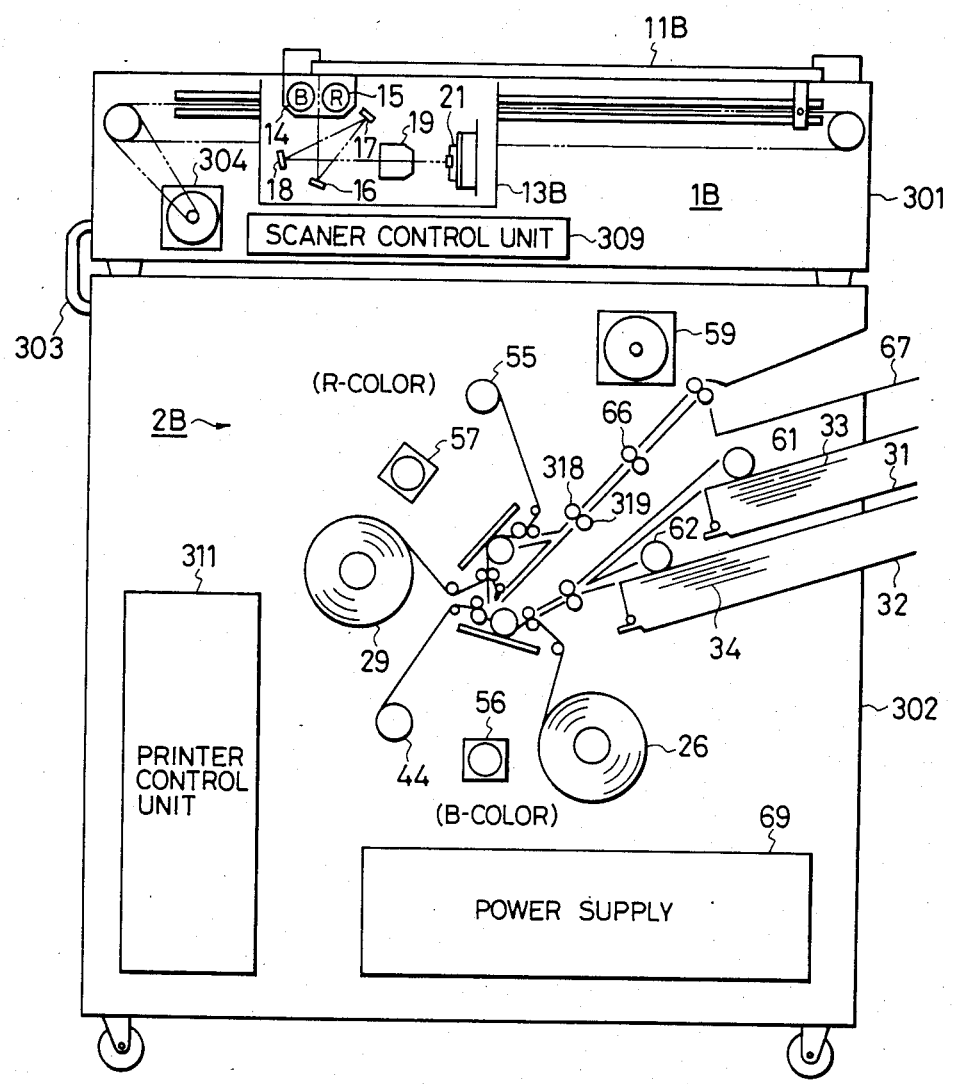
FIG. 31 is a schematic view of a two-color copying machine according to a first modification of the present invention.
Figure 32:
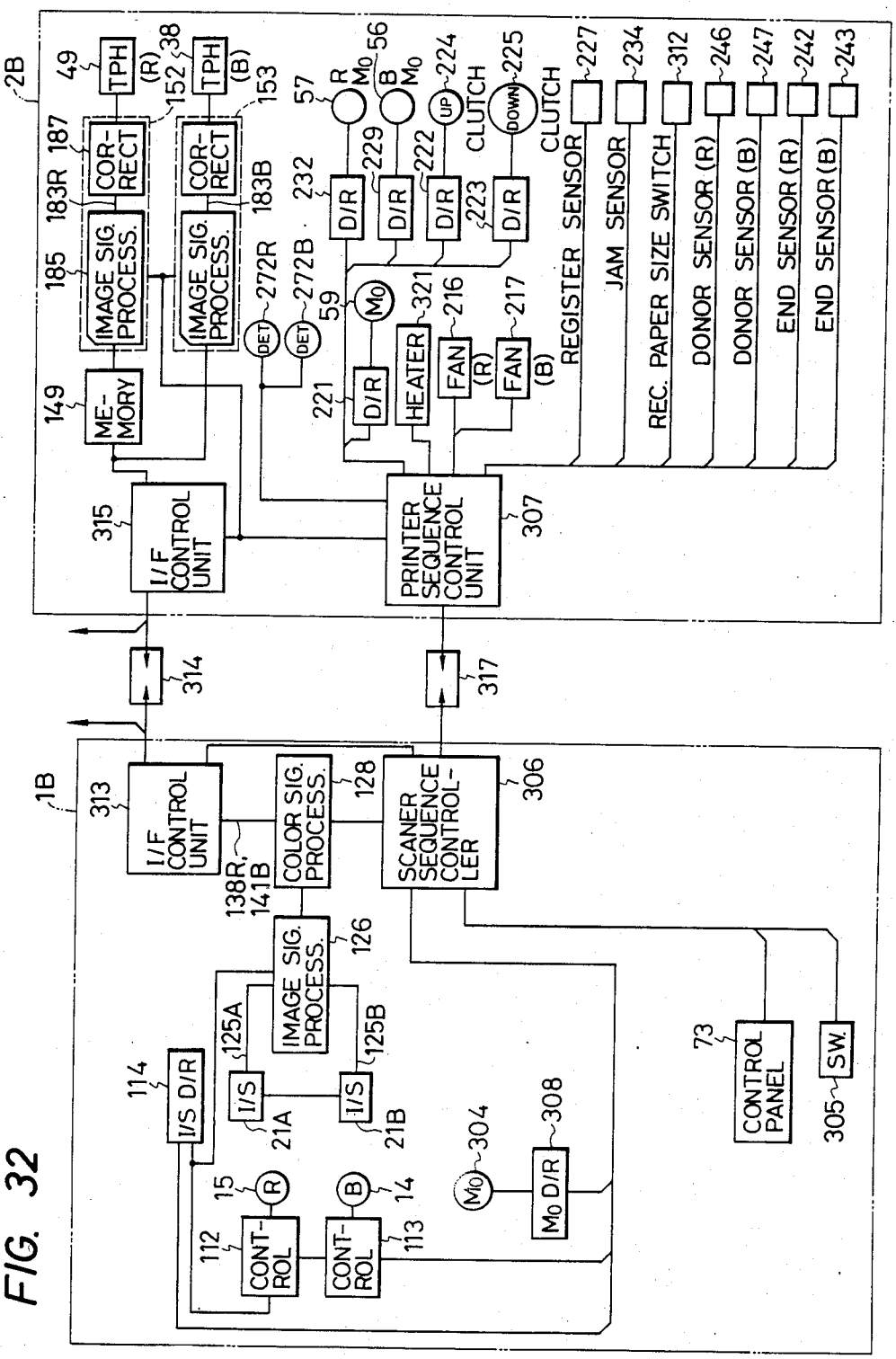
FIG. 32 is a block diagram of an electric circuit of the two-color copying machine of FIG. 31.

FIG. 31 shows a two-color copying machine according to a first modification of the foregoing embodiment, and FIG. 32 illustrates an electric circuit of the two-color copying machine of the first modification. FIGS. 31 and 32 correspond respectively to FIGS. 1 and 3, and identical parts in FIGS. 31 and 32 are denoted by the identical reference characters as in FIGS. 1 and 3 and will not be described in detail.

The modified two-color copying machine includes an image reader assembly 1B and a two-color recording assembly 2B which are housed respectively in casings 301 and 302 and interconnected by a cable 303. The image reader assembly 1B includes a scanner unit 13B fixed in position, and a platen 11B reciprocally movable by a platen motor 304. By removing the cable 303, the image reader assembly 1B and the two-color recording assembly 2B can be used independently as a reader and a printer, respectively. The image reader assembly 1B and the two-color recording assembly 2B will however be described as to their combined functions in the copying machine.

When the start switch 81 (see FIG. 2) is depressed, the platen 11B is set to the home position based on positional information issued from a platen position switch 305 disposed in place of the scanner position switch 115 (FIG. 3). When the platen 11B is not set to the home position within a given period of time, a scanner sequence controller 306 determines that the copying machine suffers from a malfunction, stops the operation of the copying machine, and causes the trouble indicator 83 to flicker.

When the platen 11B is set to the home position within the given time, the platen position switch 305 confirms this. At a prescribed timing after the platen 11B home position is confirmed, a printer sequence controller 307 energizes a motor driving circuit 308 to rotate a platen motor 304 in a normal or reverse direction, thereby controlling the reciprocating movement of the platen 11B. The scanner sequence controller 306 is housed in a scanner control unit 309 shown in FIG. 31, whereas the printer sequence controller 307 is accommodated in a printer control unit 311.

When one copy is to be produced from one original in the two-color copying machine, the scanner sequence controller 306 first controls the platen motor 304 in order to enable the platen 11B to return rapidly to the home position. When a number of copies are to be produced from an original, the image information is read while the platen 11B is moved back and forth. Therefore, while the image information is being read, the platen 11B moves at equal speeds in its forward and rearward strokes. The distance that the platen 11B moves in the auxiliary scanning direction is determined by the printer sequence controller 307 based on size information from a recording sheet size switch 312, positional information from the platen position switch 305, and a copying magnification selected on the control panel 73.

As the platen 11B starts moving in the forward or rearward stroke, the image sensors 21A and 21B in the scanner unit 13B convert a light image into an electric signal per line. Video signals 125A and 125B thus generated are processed by the image signal processing circuit 126. Thereafter, the color signal processing circuit 128 performs color separation and rearranges image signals obtained in the return stroke scanning of the platen 11B. A red image signal 138R and a black halftone image signal 141B which have been processed are delivered to an interface controller 313. The interface controller 313 operates under the control of the scanner sequence controller 306 for supplying the image signals 138R and 141R through a connector 314 to an interface controller 315 in the two-color recording assembly 2B. It is also possible to supply the image signals to a telephone circuit, an interoffice communication circuit, or a radio communication circuit without the intermediary of the connector 314 for transmitting images to other devices.

The interface controller 315 operates under the control of the printer sequence controller 307 for supplying the red image signal 138R to the image signal memory 149 and also supplying the black halftone image signal 141B to the black image signal processing circuit 153. The interface controller 315 in the two-color recording assembly 2B can receive image information from a telephone circuit, etc., while being disconnected from the connector 314, and can record the image information in one or two colors. With the image reader assembly 1B and the two-color recording assembly 2B interconnected by the connector 314, the scanner sequence controller 306 and the printer sequence controller 307 are connected by another connector 317 for conversion of control signals therebetween.

In the modified two-color copying machine, a heat roll 318 and a pinch roll 319 are paired in the feed path as shown in FIG. 31. A heater 321 (FIG. 32) is disposed in the heat roller 318 for heating the same up to a prescribed temperature. The heater 321 is energized under the control of the printer sequence controller 307 for reheating the recording sheet on which the image is recorded in one or two colors. By thus reheating the recording sheet, the transferred ink permeates the fibers of the recording sheet more deeply and is fixed more firmly. Even when the inked surface of the recording sheet is rubbed strongly, the ink is not blurred or removed. Where the recording sheet is used only for ordinary purpose, a switch in the printer sequence controller 307 may be operated in advance to prevent the heater 321 from being energized for thereby lowering the power consumption.

Since the platen 11B is movable in the two-color copying machine of the first modification, the image reader assembly 1B can be of a compact design. Inasmuch as the image reader assembly 1B and the two-color recording assembly 2B are housed in the different casings which are separable from each other, only the image reader assembly 1B may be placed on a desktop or rotated easily so that it can be operated upon more efficiently.

Second Modification

Figure 33:
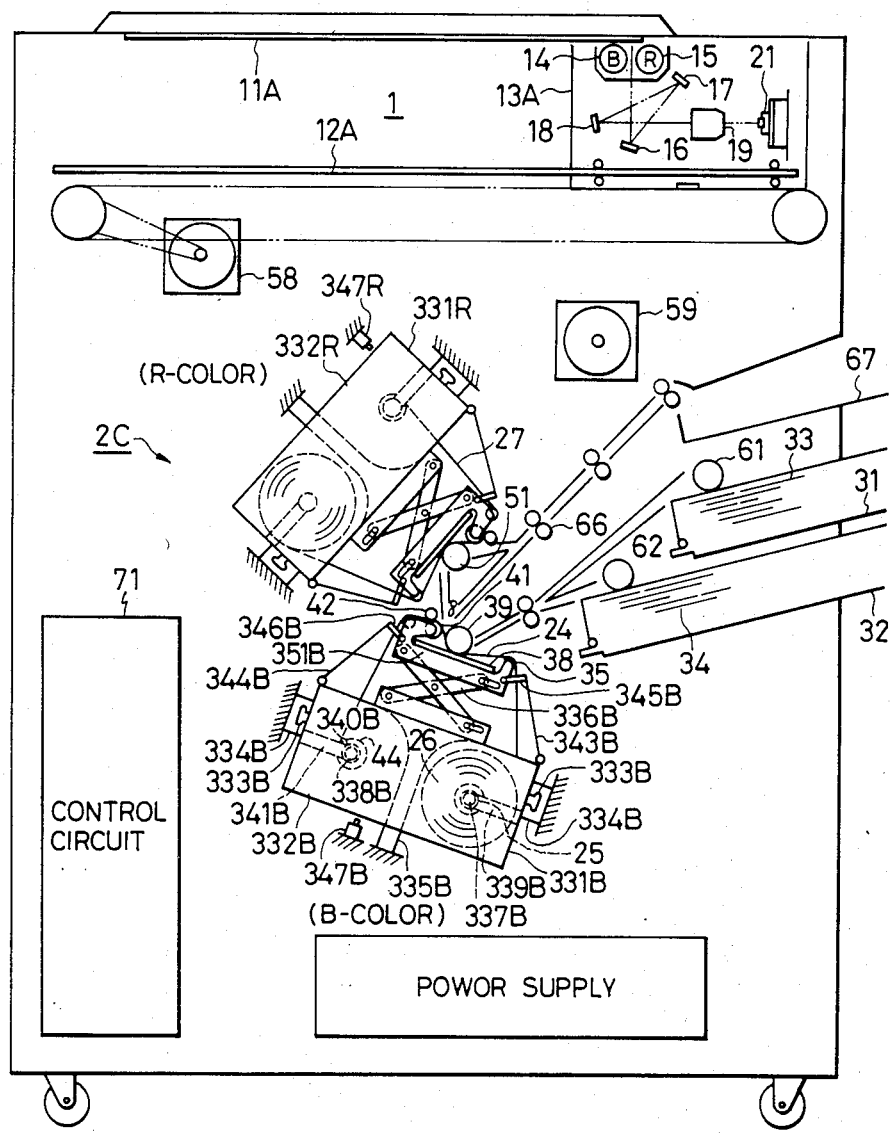
FIG. 33 is a schematic view of a two-color copying machine according to a second modification of the present invention.

FIG. 33 illustrates a two-color copying machine according to a second modification. Identical parts in FIG. 33 are denoted by identical reference characters as used in FIG. 1 and will not be described in detail.

The two-color copying machine of the second modification uses ink donor sheets contained in ink donor sheet cassettes for easy replacement of the ink donor sheets. Since the black ink donor sheet cassette 331B for recording in black and the red ink donor sheet cassette 331R for recording in red are of the same construction, the black ink donor sheet cassette 331B will mainly be described hereinbelow.

The black ink donor sheet cassette 331B includes a cassette body 332B which is substantially C-shaped to avoid interference with a support member 335B fixed to the copying machine body. The cassette body 332B is attached to the recording assembly with guided portions 333B guided by two guide rails 334B fixed to the copying machine body. The support member 335B supports the black thermal head 38 and other members through link levers 336B.

Supply and takeup shafts 337B and 338B are mounted respectively by sheet pressers 339B and 341B on the cassette body 332B. The paper tube 24 of the black recording sheet supply roll and a takeup reel 340B of the black recording sheet takeup roll are detachably mounted respectively on the shafts 337B and 338B. Covers 343B and 344B are hinged to the cassette body 332B, and supply and takeup guide rollers 345B and 346B are mounted on inner sides of the distal ends of the covers 343B and 346B.

When the detachable cassette body 332B is mounted in a prescribed position, a projection (not shown) on the cassette body 332B pushes a switch 347B to confirm that the black ink donor sheet 24 has been set in the black recording assembly. A similar projection is disposed in a different position on a cassette body 332R for the red ink donor sheet cassette, and a switch 347R in the red recording assembly is positioned for coaction with the projection on the cassette body 332R. Therefore, even when a cassette body containing an ink donor sheet of a wrong color is mounted in one of the recording assemblies, the switch 347B or 347R in that recording assembly is not actuated, and the user can immediately find out that the wrong cassette body has been mounted.

Where the ink donor sheet cassette 331B is not attached to the copying machine, a head base 351B is lowered to its lower limit position by the link levers 336B mounted on the support member 333B. The black thermal head 38, the black drive roll 41, and the guide roll 35 are mounted on the head base 351B. Under this condition, there is a prescribed clearance present between the black back roll 39 and the black thermal head 38.

The operator of the copying machine now attaches the ink donor sheet cassette 331B. When the covers 343B and 344B are opened by the operator, the black ink donor sheet 24 is pulled out by the guide rollers 345B and 346B and kept taut therebetween. By fitting the guided portions 333B over the guide rails 334B to insert the cassette body 332B, the black ink donor sheet 24 is disposed between the black back roll 39 and the black thermal head 38.

In the final stage of attachment of the ink donor sheet cassette 331B, the link levers are moved to the upper limit position in interlinking relation to a mechanism (not shown). The black back roll 39 is now pressed against the black thermal head 38 under a prescribed pressure through the black ink donor sheet 24. The drive roll 41 is also pressed against the black pinch roll 42 through the black ink donor sheet 24 so as to be able to feed the ink donor sheet for thermal transfer recording.

The ink donor sheet cassette 331B can be removed by reversing the above process. The removed ink donor sheet cassette 331B can be rendered compact in form by closing the covers 343B, 344B so that it can easily be handled as for retrieval.

With the two-color copying machine of the second modification, the ink donor sheets can reliably and quickly be replaced by anybody. Since the types of the ink donor sheets can be checked, the danger of recording images in a wrong color can be avoided. The types of the ink donor sheets can be discriminated by not only a mechanical switch, but also an optical switch or a magnetic switch.

While the recording colors in the above-mentioned two-color copying machines have been described as black and red, images can be recorded or copied in other recording colors. Although the copying machine has been described primarily with respect to the copying operation, the copying machine can be employed in cooperation with an external image processing device for combining, deleting or otherwise processing images and recording the processed images. The cable interconnecting the image reader assembly and the two-color recording assembly or the cable interconnecting the copying machine to another image processing device may comprise an optical fiber.

The two-color copying machine of the thermal transfer recording system according to the present invention meets the object of this invention by being able to record a two-color image clearly on plain paper while consuming a relatively small amount of electric power.

Although certain preferred embodiments have been shown and described, it should be understood that many changes and modifications may be made therein without departing from the scope of the appended claims.

What is claimed is:

1. A two-color copying machine capable of producing a copy with two colors from an original to be copied comprising:
   (a) platen means for supporting the orignal to be copied;
   (b) scanner unit means movable reciprocally relative to said platen means in a scanning direction for reading a series of lines on the original and for generating a composite image signal for each said line, said composite image signal being separated into two single color image signals, each corresponding to one of the two colors;
   (c) a pair of thermal head means, each having a heating region with heating body units for selectively generating thermal pulses, each said thermal head means respectively generating said thermal pulses in response to a different one of the single color image signals from said scanner unit means;
   (d) means for supplying each said thermal head means with a cooresponding ink donor shhet coated with thermally transferable inks of one of said two colors, said inks becoming fluidized or sublimated when heated;
   (e) means for supplying a recording sheet in the vicinity of at least one said thermal head means;
   (f) means for bringing the recording sheet into intimate contact with said heating region of each of said thermal head means and for interposing the ink donor sheet between the recording sheet and said heating regions to record an image on the recording sheet;
   (g) means for separating the ink donor sheets from the recording sheet and for discharging the recording sheet after the image has been recorded on the recording sheet;

(h) buffer memory means for temporarily storing at least one of the image signals from said scanner unit means; and (i) means responsive to the number of image signals stored in said buffer memory means for controlling the speed of movement of said scanner unit relative to said platen in the auxiliary scanning direction when the original is read.

2. A two-color copying machine according to claim 1, including two light sources having first and second spectral characteristics, light source control means for illuminating the original during a first time period with light from said light sources having a first spectral distribution characteristic and for illuminating theoriginal during a second time period with light from said light sources having a second spectral distribution characteristic; scanning control means for scanning a line of the original at least twice; and color separating means for generatingsaid two single color image signals, one single color image signal being produced by reading the original with said light having said first spectral distribution characteristic and the other single color image signal produced by reading the original with said light having said second spectral distribution characteristic.

3. A two-color copying machine according to claim 2 wherein the light source control means energizes one of the light sources during both the first and second time periods and energizes the other light source during only one of the first and second time periods.

4. A two-color copying machine according to claim 2 wherein said scanning means includes means for implementing first and second scannings of each line of said original and wherein said first time period is concurrent with said first scanning of a line of the original and said second time period is concurrent with said second scanning of the same line of the original.

5. A two-color copying machine according to claim 1, including a thermal-storage computing unit means, responsive to the image signal which affects the heating of each unit heating body, for individually computing the amount of thermal energy stored in each of the heating body units of said thermal heads; memory means for storing a signal representing the duration of the pulse applied to each heating body unit a preceding line was recorded and for issuing said stored pulse duration signals as thermal hysteresis data; pulse duration computing means for computing the duration of a pulse to be applied to each heating body unit based on said thermal hysteresis data; and correcting means for correcting the computed pulse durations based on additional printing characteristics.

6. A two-color copying machine according to claim 5 wherein the additional printing characteristics include data on the number or ratio of print dots for a line to be currently printed.

7. A two-color copying machine according to claim 5 wherein the additional printing characteristics include data on an interval after the previous line has been recorded and before the present line starts to be printed.

8. A two-color copying machine according to claim 5 wherein the additional printing characteristics include data on the temperature of the substrate of said thermal heads.

9. A two-color copying machine according to claim 1, including a halftone image generating circuit means for generating values for a plurality of pixels, each pixel comprising a matrix of dot data representing the degree of darkness of the corresponding image in a segment of the line which is read, and wherein the degree of darkness of a segment to be printed is expressed by varying the number or size of dots in each pixel.

10. A two-color copying machine according to claim 9 further including means for monitoring thermal storage effects of the heating body units surrounding each heating body unit means for monitoring the thermal storage effects of the heating body units surrounding each heating body unit and for computing the proper number and degree of darkness of dots to be currently printed.

11. A two-color copying machine according to claim 1, further including displacement detecting means for detecting a displacement of the ink donor sheet and the recording sheet, and displacement control means for controlling the displacement of the ink donor sheet relative to the recording sheet so that the displacement of the ink donor sheet relative to the recording sheet as detected by said displacement detecting means will be equalized to each other.

12. A two-color copying machine according to claim 1, including a housing having means for detachably attaching cassettes containing the ink donor sheets.

* * * * *

UNITED STATES PATENT AND TRADEMARK OFFICE
CERTIFICATE OF CORRECTION

PATENT NO. : 4,661,703

DATED : April 28, 1987

INVENTOR(S) : Noriyoshi Ishikawa et al.

It is certified that error appears in the above-identified patent and that said Letters Patent is hereby corrected as shown below:

Claim 1, column 30, line 55 change "cooresponding" to --corresponding-- and "shhet" to --sheet--.

Claim 2, column 31, line 16, change "theoriginal" to --the original--.

Signed and Sealed this

First Day of September, 1987

Attest:

DONALD J. QUIGG

Attesting Officer

Commissioner of Patents and Trademarks